June 2, 1925. 1,540,438
J. H. THOMPSON
AIRCRAFT STABILIZER
Filed Oct. 26, 1922 11 Sheets-Sheet 6
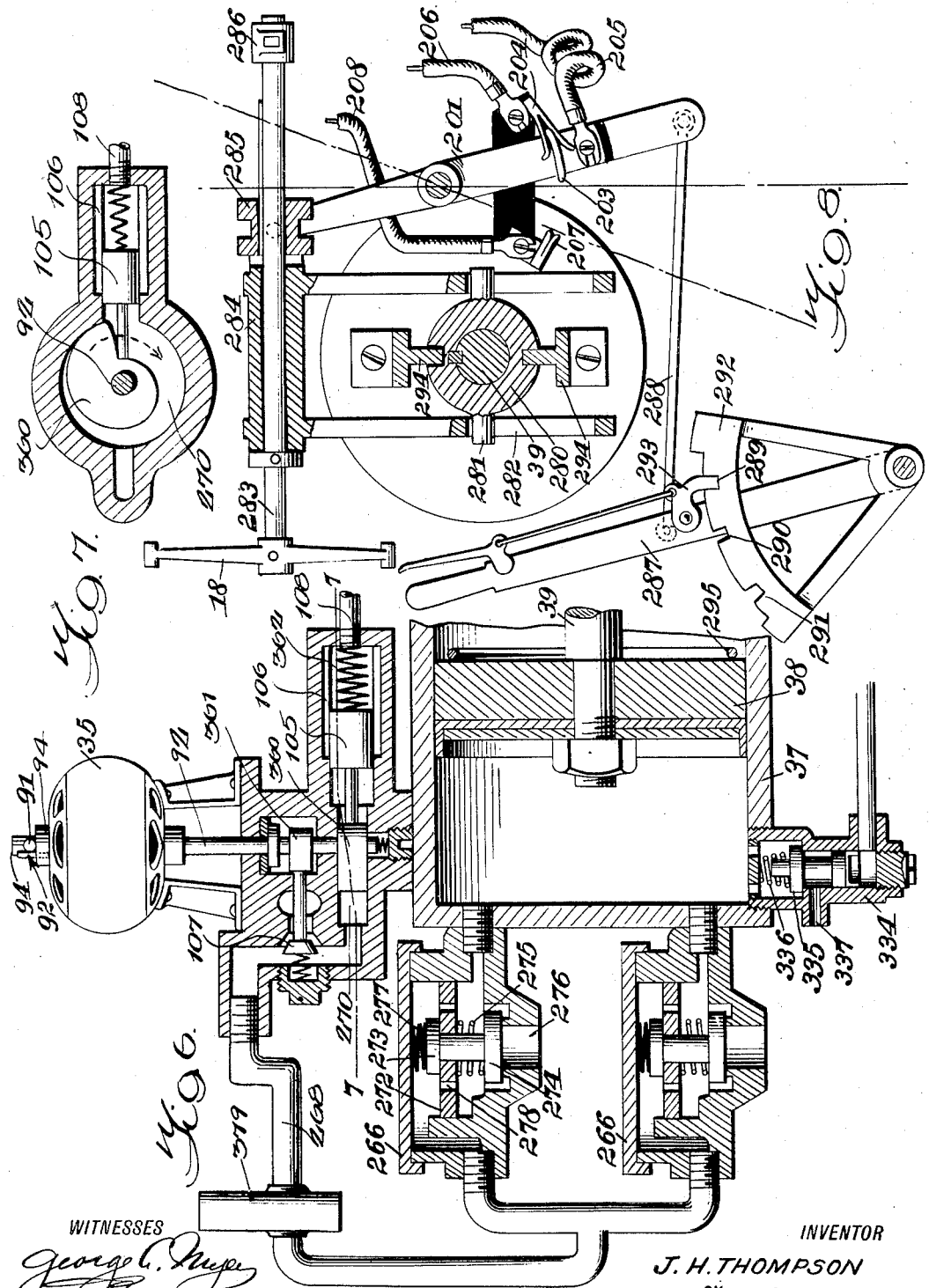
WITNESSES
INVENTOR
J. H. THOMPSON
BY
ATTORNEYS

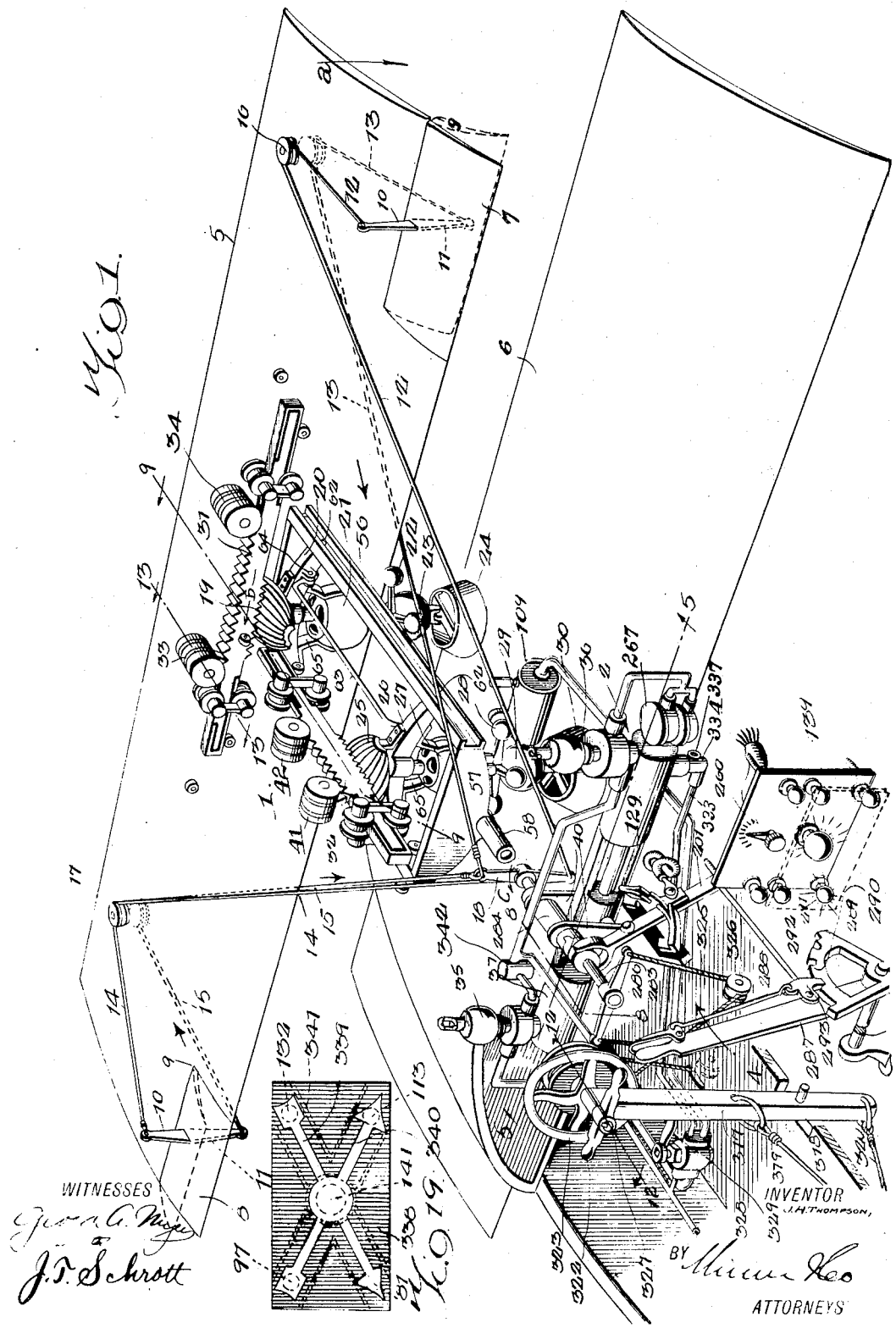

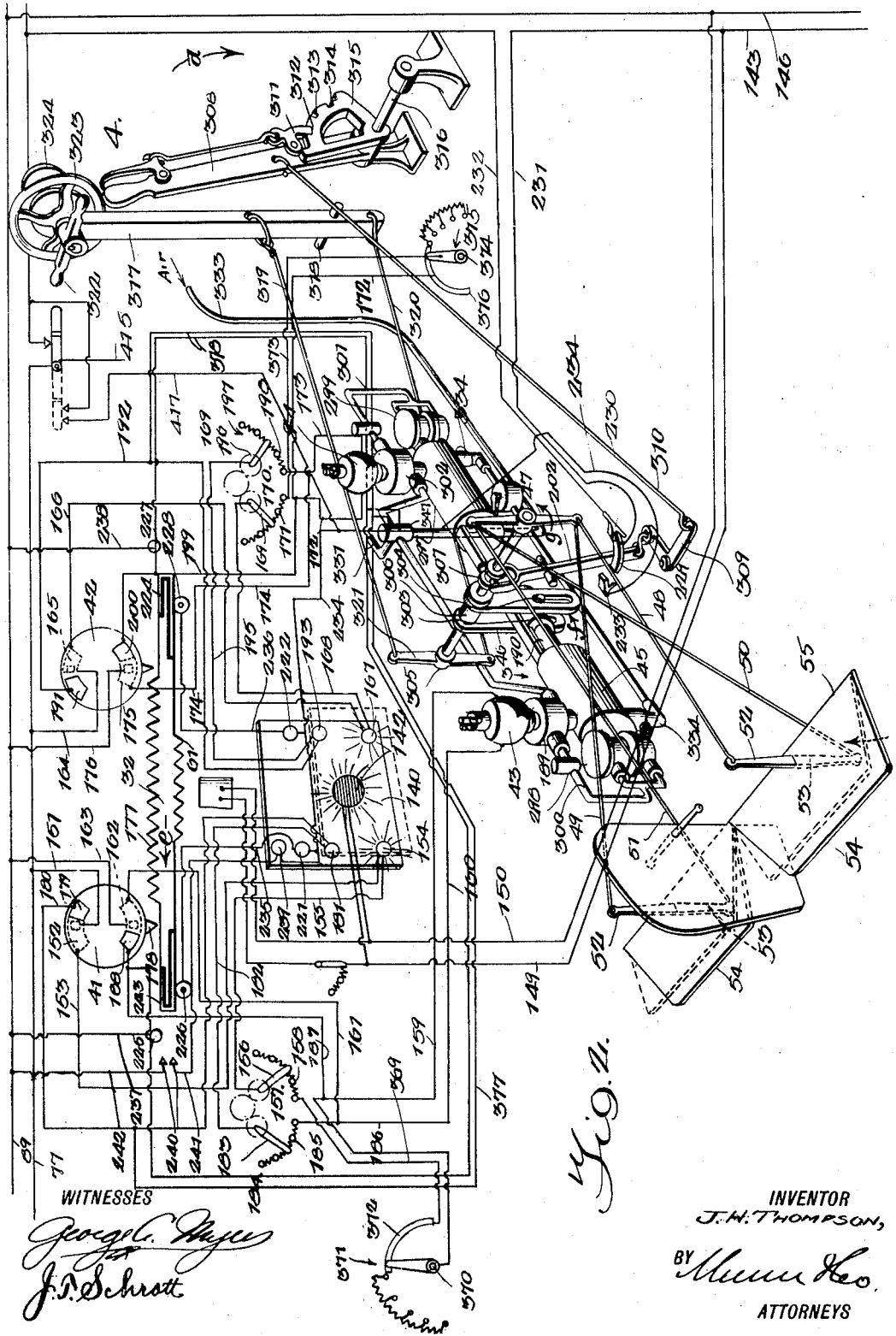

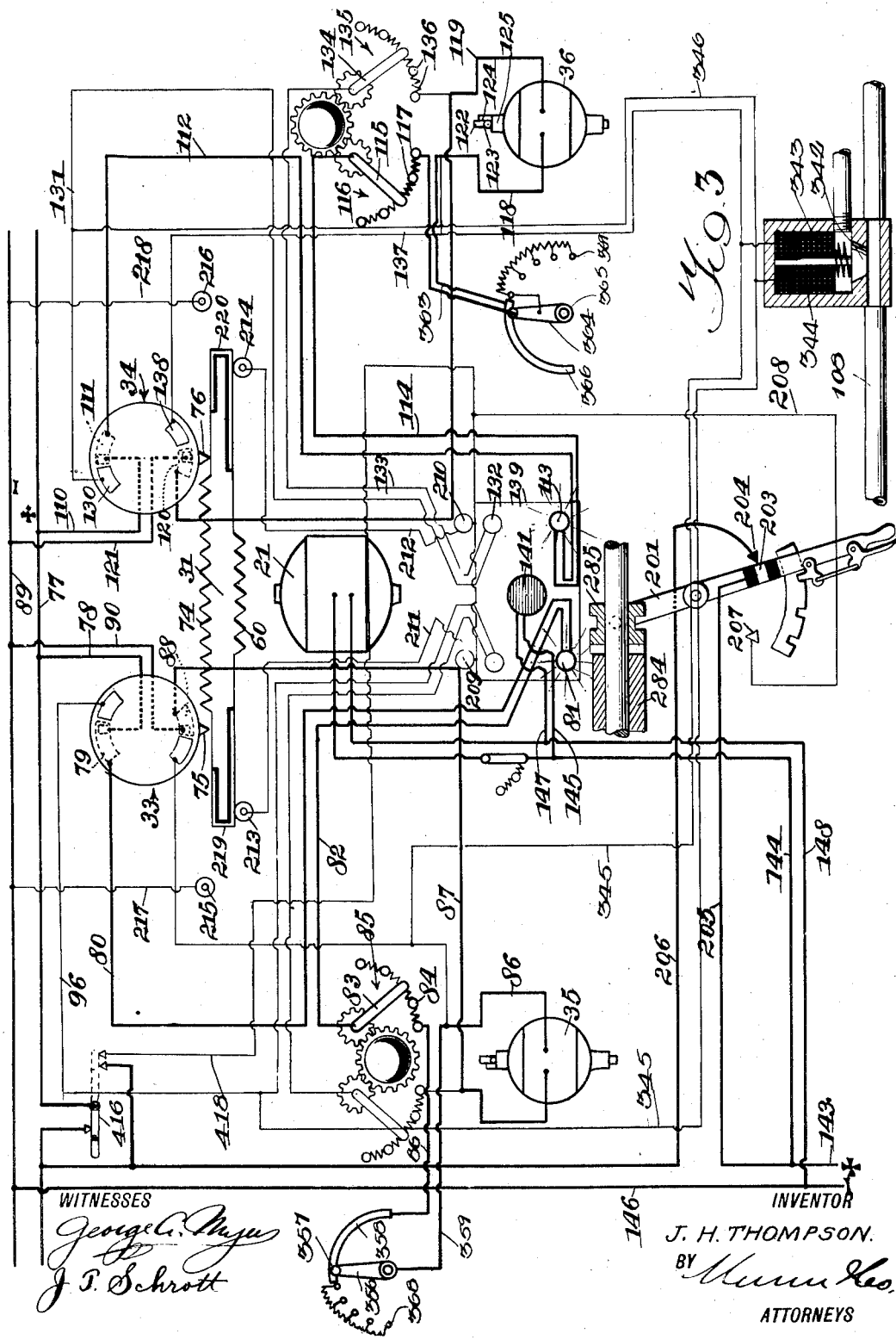

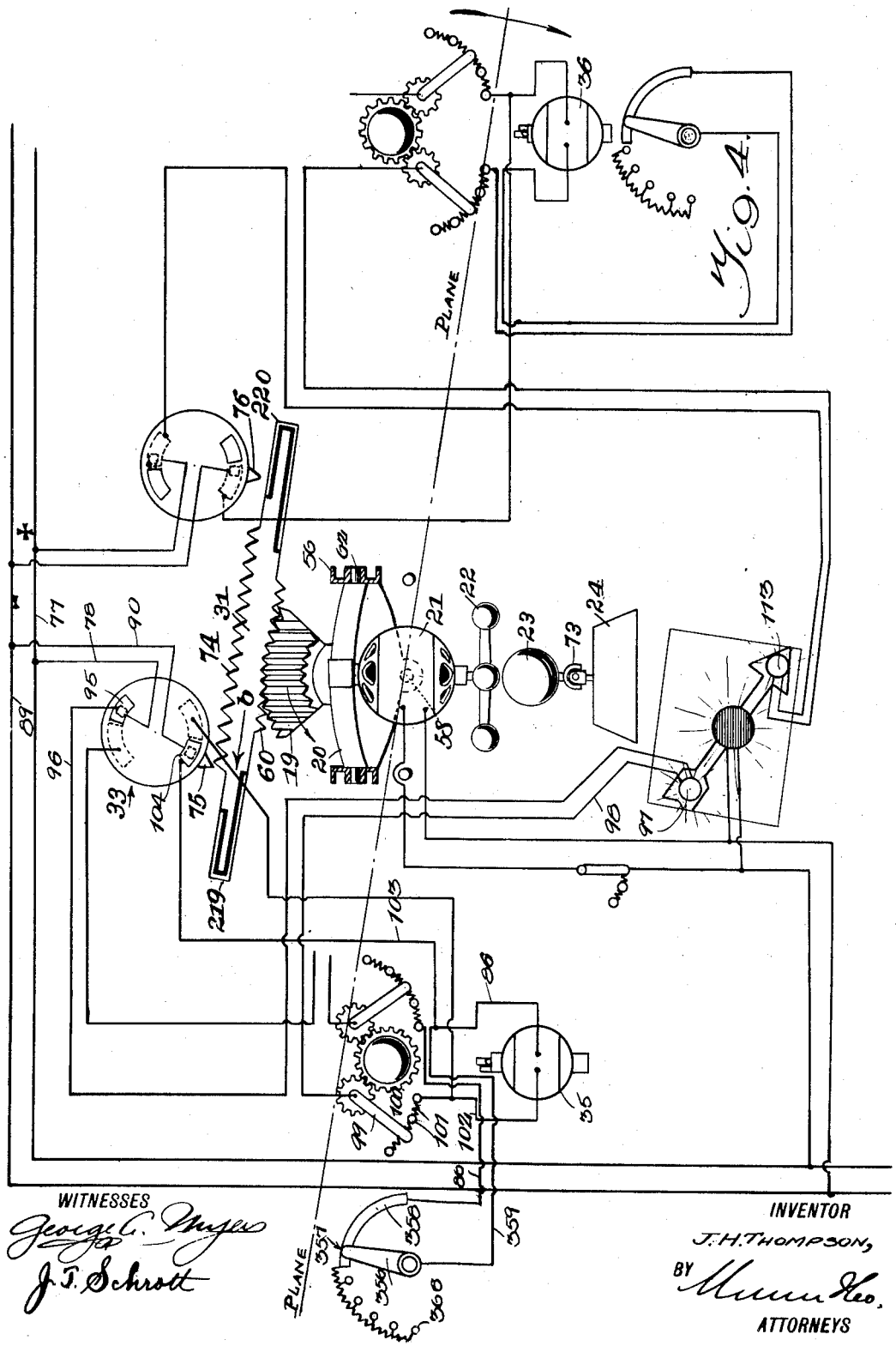

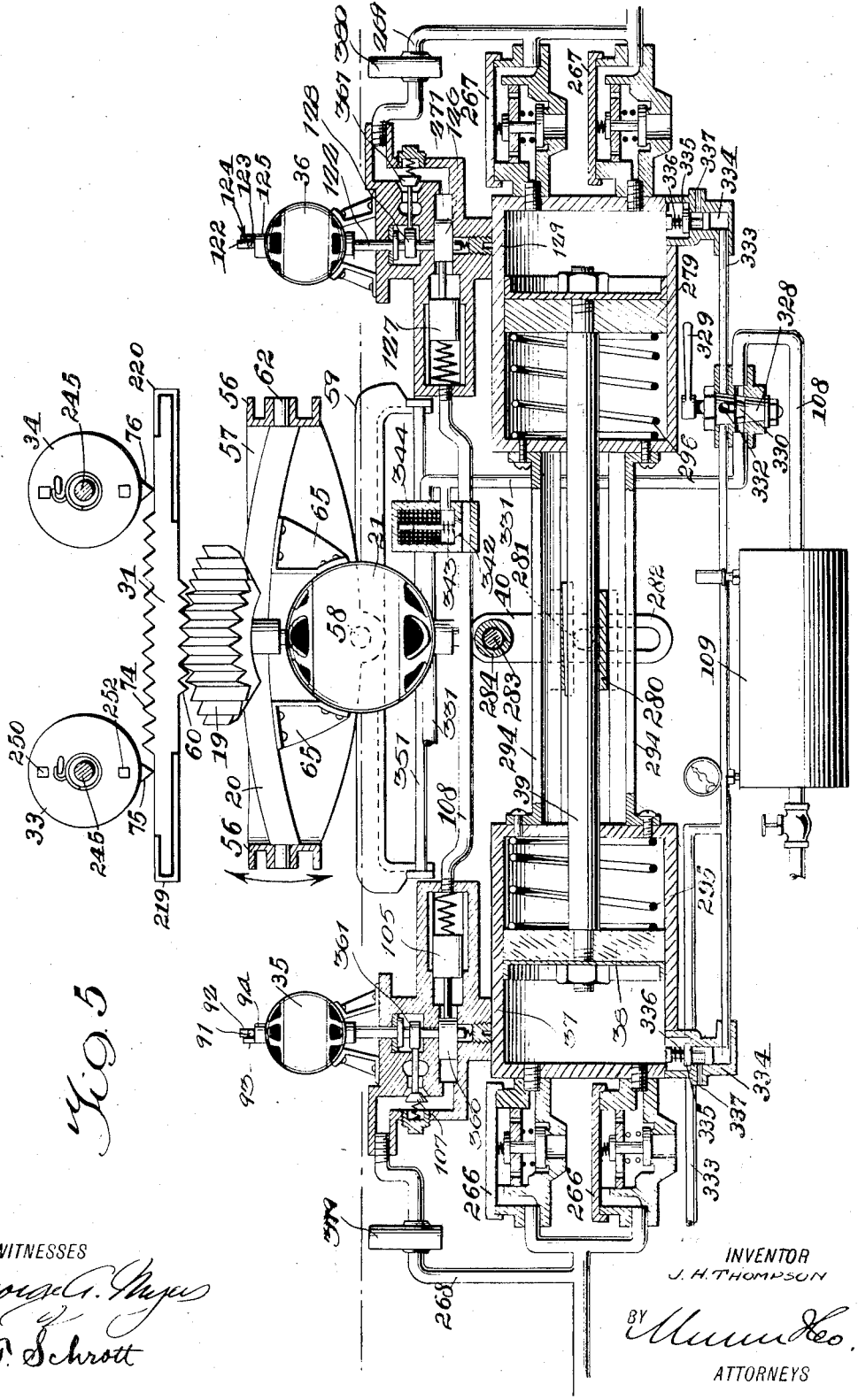

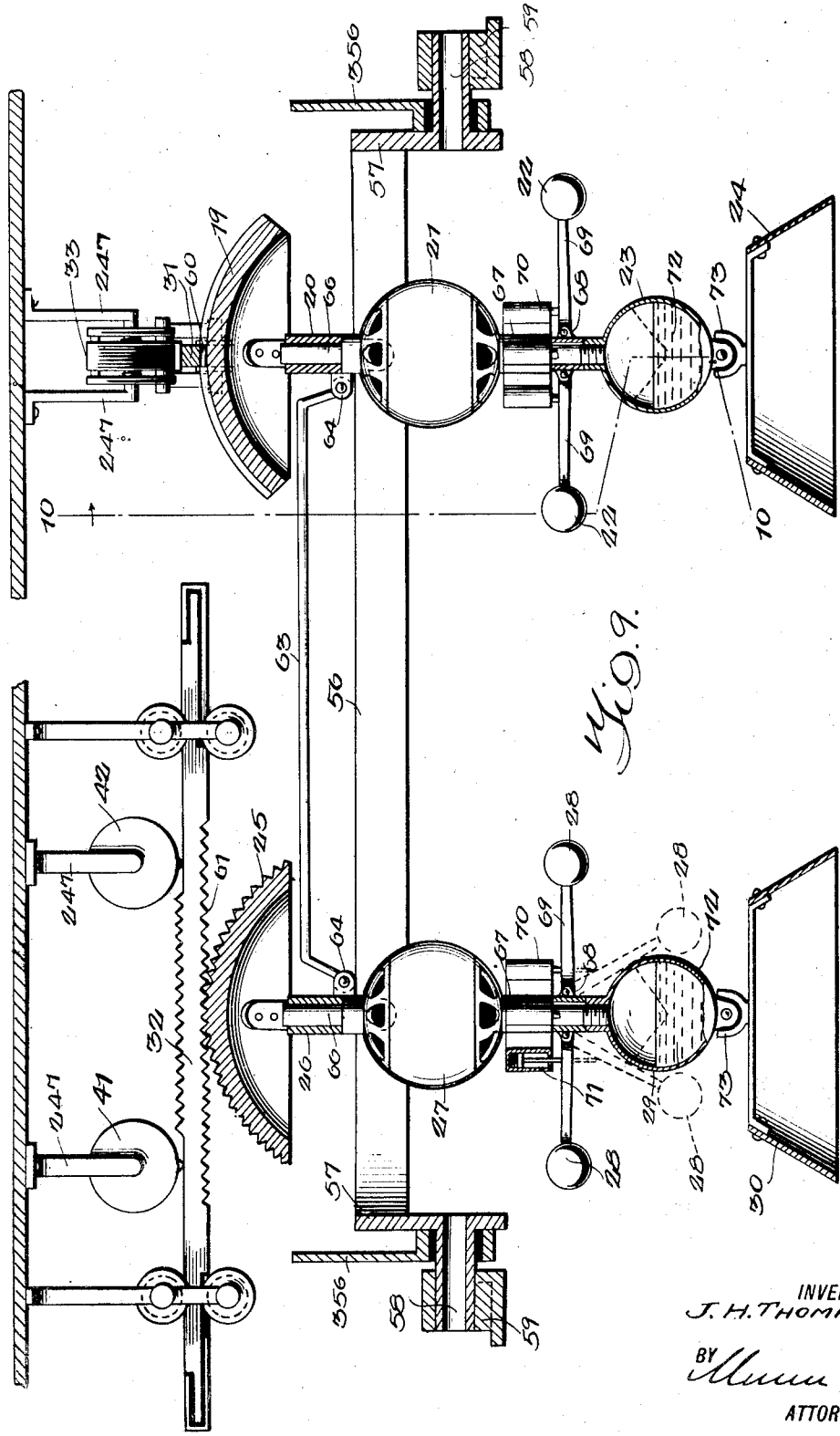

June 2, 1925.
J. H. THOMPSON
AIRCRAFT STABILIZER
Filed Oct. 26, 1922    11 Sheets-Sheet 8
1,540,438
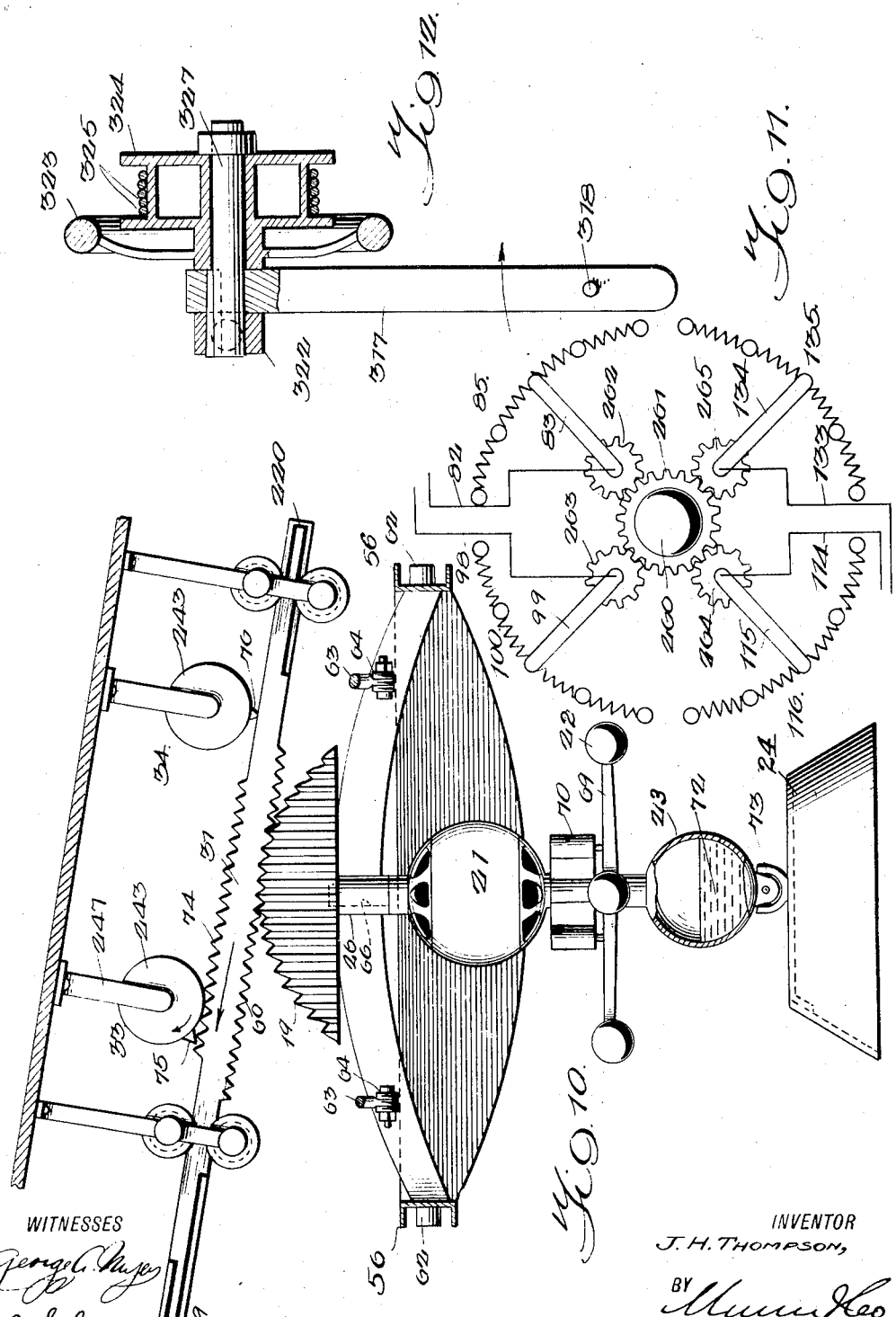
WITNESSES
INVENTOR
J. H. THOMPSON,
BY
ATTORNEYS June 2, 1925.
J. H. THOMPSON
AIRCRAFT STABILIZER
Filed Oct. 26, 1922
1,540,438
11 Sheets-Sheet 9
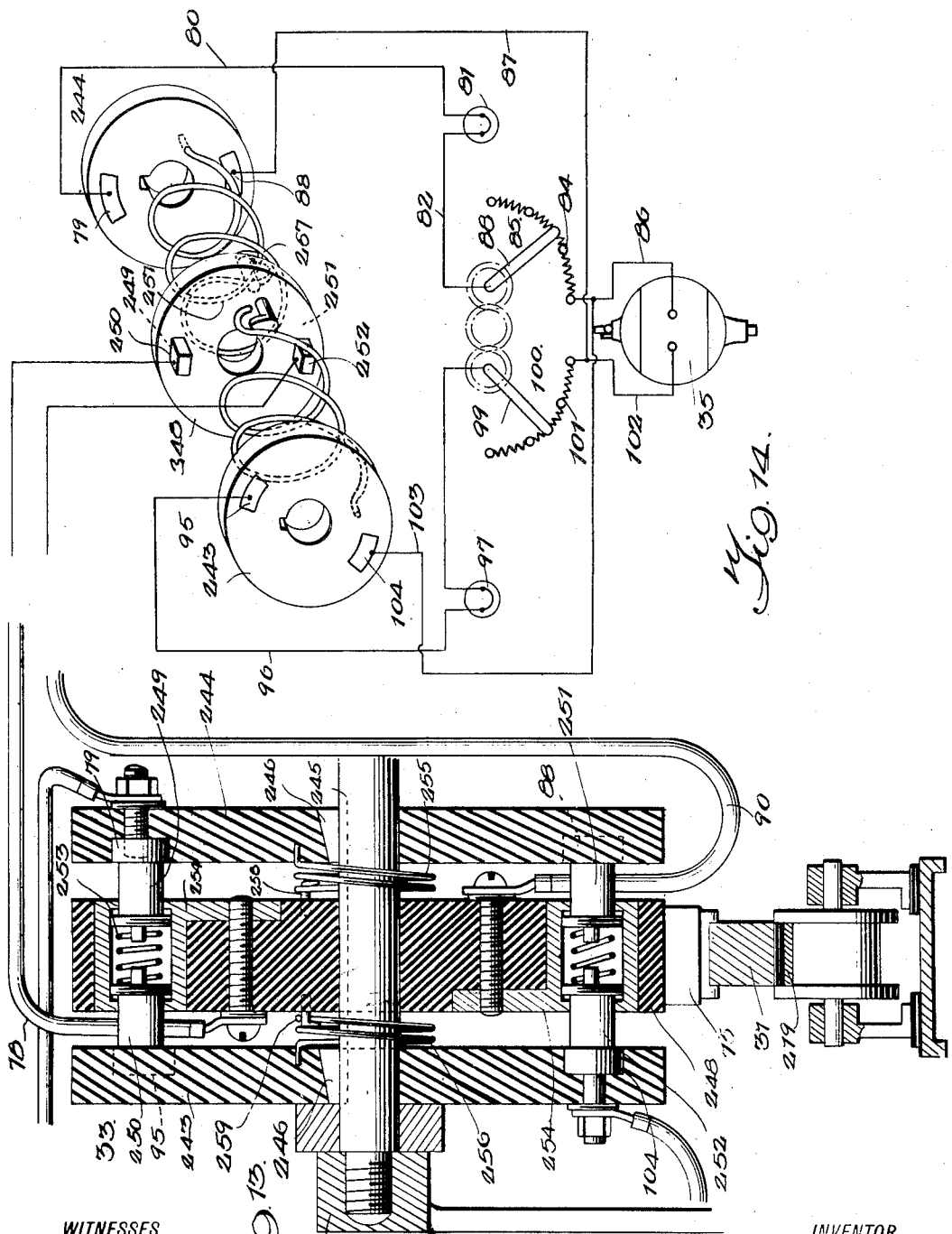

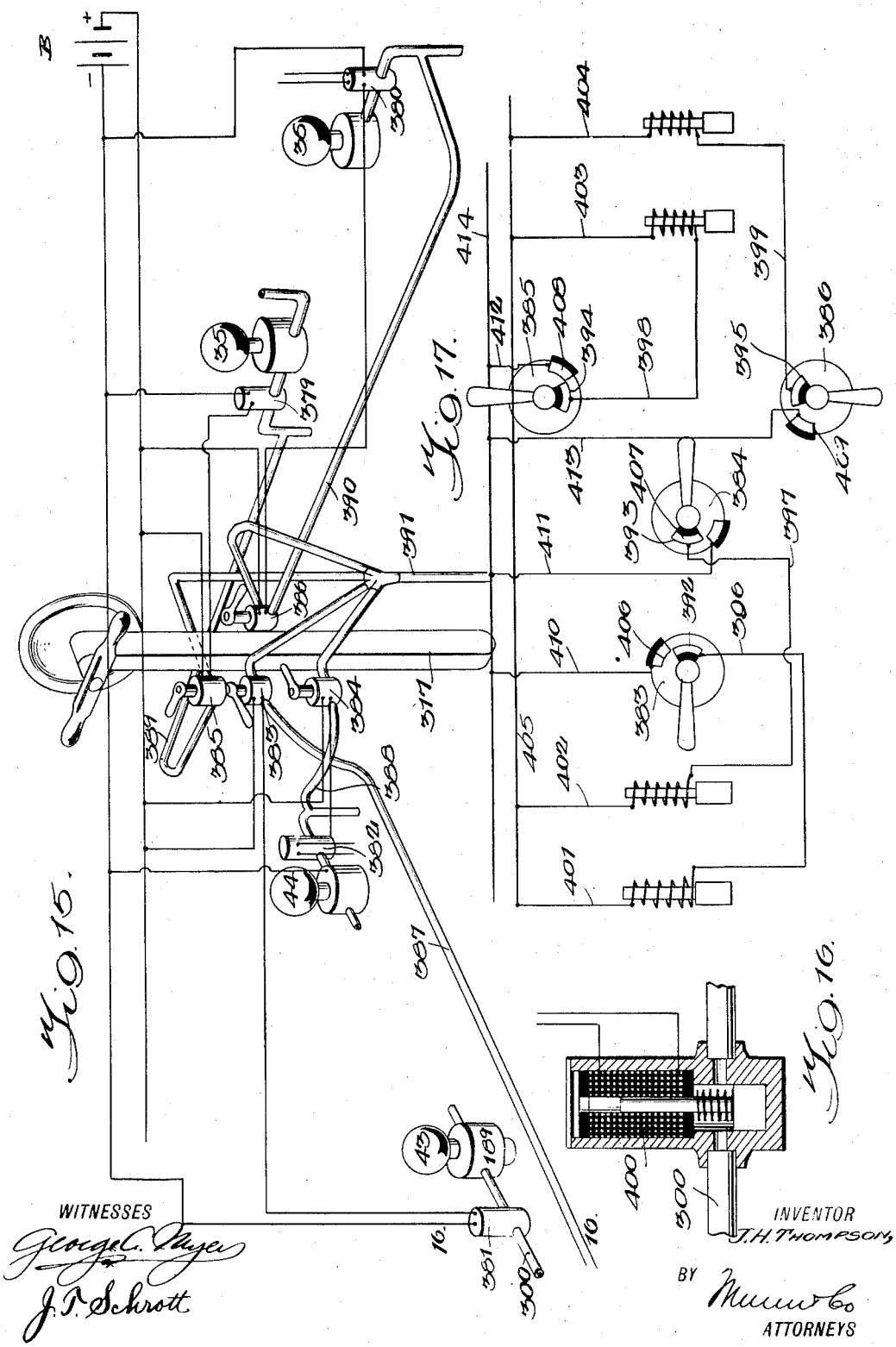

June 2, 1925.
J. H. THOMPSON
1,540,438
AIRCRAFT STABILIZER
Filed Oct. 26, 1922    11 Sheets-Sheet 11
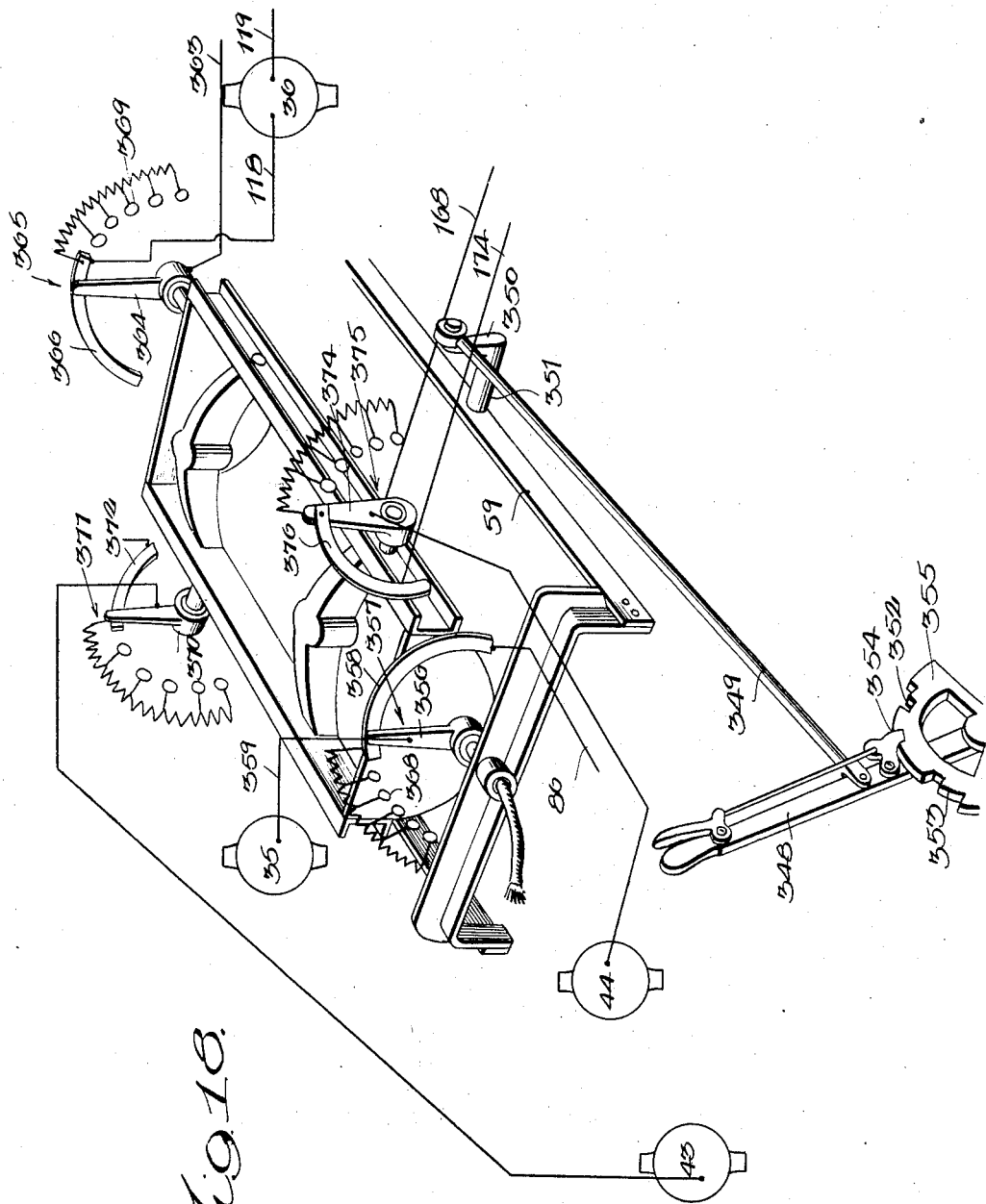
WITNESSES
INVENTOR
J. H. THOMPSON,
BY
ATTORNEYS Patented June 2, 1925.

1,540,438

UNITED STATES PATENT OFFICE.

JAMES HENRY THOMPSON, OF HOLLIDAYS COVE, WEST VIRGINIA.

AIRCRAFT STABILIZER.

Application filed October 26, 1922. Serial No. 597,115.

*To all whom it may concern:*

Be it known that I, JAMES HENRY THOMPSON, a citizen of the United States, and a resident of Hollidays Cove, in the county of Hancock and State of West Virginia, have invented certain new and useful Improvements in Aircraft Stabilizers, of which the following is a specification.

My invention relates to improvements in stabilizing apparatus for aircraft and it consists in the constructions, combinations and mode of operation herein described and claimed.

An object of the invention is to provide apparatus which is primarily adaptable to aircraft of all types, its purpose being to maintain the craft on a substantially even "keel" during flight.

A further object of the invention is to provide apparatus to constitute an auxiliary to the manually controlled stabilizing devices of an aircraft, the purpose of which apparatus is to automatically perform the functions of said stabilizing devices should the operator desire to have it so.

Another object of the invention is to provide stabilizing apparatus for aircraft which may be made to operate either manually or automatically.

A further object of the invention is to provide automatic stabilizing apparatus for aircraft comprising an arrangement of perpendicles which are intended to always maintain a perpendicular position, certain rack bars being shiftable by virtue of this perpendicularity when the aircraft departs from its horizontal flying plane to a predetermined undesired degree, thereby bringing certain fluid-operated devices into play to actuate the provided stabilizing devices (ailerons, rudders, wing tips, etc.) to re-establish the craft in its aforesaid horizontal flying plane.

Another object of the invention is to provide mechanically, electrically and fluid-operated devices all of which cooperate in actuating the stabilizing means of an aircraft in order to automatically keep the aircraft on an even "keel."

A further object of the invention is to provide a control which is auxiliary to both the automatic and manual controls, in the nature of an emergency control which, however, may be used interchangeably with the manual control.

Other objects and advantages will appear in the following specification, reference being had to the accompanying drawings, in which:—

Fig. 1 is a diagrammatic perspective view illustrating the apparatus for actuating the ailerons of an airplane to thereby control the lateral stabilization thereof, Fig. 2 is a diagrammatic perspective view which is intended to be read in connection with Fig. 1, illustrating the fluid-actuated apparatus for controlling the horizontal rudders and thereby the longitudinal stabilization of the airplane, the accompanying wiring diagram being a duplication of the stabilizing mechanism in Fig. 1, in so far as the longitudinal rack bar and its switches are concerned, Fig. 3 is a diagram of the electrical part of the apparatus which controls the lateral stabilization of the aircraft, Fig. 4 is an electrical diagram similar to Fig. 3, illustrating the actions which take place when the airplane tilts toward the right, only so much of the wiring being shown as is necessary to illustrate the circuits involved, Fig. 5 is a section taken substantially on the line 5—5 of Fig. 1, illustrating the pistons and fluid-controlling means therefor to actuate the ailerons, also illustrating a part of the lateral perpendicle with its rack bar and switches so as to more readily associate this view with Fig. 3, in which connection it may be read, Fig. 6 is a detail enlarged section of the left cylinder in Fig. 5, Fig. 7 is a section on the line 7—7 of Fig. 6, illustrating the cam which gradually opens the air valve for slowly introducing air into the left end of the cylinder in Fig. 6, Fig. 8 is a section taken substantially on the line 8—8 of Fig. 1, the switch contact on the auxiliary clutch lever being shown on the side nearest the observer (reverse from the showing in Fig. 1) so as to make the construction more comprehensive, Fig. 9 is a longitudinal section of the stabilizing apparatus, taken substantially on the line 9—9 of Fig. 1, Fig. 10 is a cross section on the line 10—10 of Fig. 9, showing the lateral stabilizing perpendicle and illustrating the action which takes place when the plane tilts toward the right, Fig. 11 is a detail diagrammatic view showing how the rheostat in Fig. 3 will in practice be operated by a single knob, Fig. 12 is a detail section on the line 12—12 of Fig. 1, showing the construction of the post and hand wheel by which the ailerons and horizontal rudders are manually controlled, Fig. 13 is a detail section of one of the electrical switches, taken substantially on the line 13—13 of Fig. 1, Fig. 14 is a diagrammatic perspective view showing the parts of said switch disassembled, Fig. 15 is a diagrammatic perspective view of the aircraft hand lever and an associated arrangement of air and electro-magnetic valves constituting an emergency control, Fig. 16 is a section on the line 16—16 of Fig. 15, illustrating the construction of one of the electro-magnetic valves, Fig. 17 is a diagram illustrating how the electro-magnetic valves cooperate with the air valves on the hand lever, Fig. 18 is a diagrammatic perspective view of the rheostatic arrangement for regulating the closing of the lateral and longitudinal control air motors in Figs. 1 and 2, also illustrating the base frame by means of which the entire apparatus is set to conform to predetermined angles of ascent and descent, and Fig. 19 is an elevation of the cover plate of one of the lamp panels (Fig. 1 for example).

The purpose of the invention is to provide a stabilizing apparatus for aircraft comprising a pair of gyroscopic perpendicles, the first of which is arranged, through suitable electrical wiring, to control a fluid-actuated mechanism which in turn operates the ailerons, the second of which, through substantially identical electrical wiring, is arranged to control a second fluid-actuated mechanism which in turn operates the horizontal rudders. The first gyroscopic perpendicle is therefore, by virtue of its function, hereinafter termed the "lateral control perpendicle", the second being termed the "longitudinal control perpendicle" by virtue of its function. The same plan of distinction is followed in respect to other mechanisms which are associated with these perpendicles.

It is intended that the aircraft on which the invention is installed shall move along a normally straightway course, lateral and longitudinal tilting within certain safe predetermined limits being allowed by the adjustment of the automatic stabilizing apparatus. As its name implies, this apparatus is intended to operate independently of the will of the pilot or other operative in charge of the aircraft, and when the aircraft tilts either laterally or longitudinally beyond a safe degree, the apparatus comes into play to operate either an arrangement of ailerons, wing tips, rudders, or the like, to restore the aircraft to its former flying position.

Sight is not lost of the desirability of alternate modes of controlling the aircraft and provisions toward this end are made in the automatic stabilizing apparatus mentioned above and in the usual manually operated apparatus by which the ailerons and rudders may be operated equally as well. The invention has the advantage of readily shifting over from one to the other mode of control by simply pushing forwardly on two levers, such act immediately severing all electrical connections rendering the fluid-actuated control mechanisms entirely free. In addition to the automatic and manual controls, provision is made of an emergency control which comprises the use of the mechanism disclosed in Fig. 15. This comes under the category of manual controls and is intended to be used only in such cases when the motors or their connections fail. With this brief introduction, the reader will more readily understand the description of the general construction which, as already intimated, comprises the stabilizing apparatus 1, the lateral control fluid-actuated mechanism 2, the longitudinal control fluid-actuating mechanism 3 and the manual control mechanism 4 (Figs. 1 and 2). The stabilizing apparatus 1 and lateral control mechanism 2, constituting the greatest combined weight, will be suitably distributed around the center of gravity of the aircraft which, in the present instance, is located somewhere between the planes 5 and 6. The invention is shown greatly out of proportion to the planes 5 and 6 in Fig. 1, the elements 1, 2 and 3 in actual practice being small enough for disposal in the fuselage of the aircraft without being in the way of either passengers or other mechanism.

Each end of the upper plane 5 is equipped at the trailing edge with an aileron 7 and 8, these being pivoted at the points 9. Each aileron has a double arm 10 and 11 to which cords 12, 13 and 14, 15 are attached (Fig. 1) these cords running over pairs of grooved rollers 16 and 17 so that they may be properly led to their respective points of attachment to the double crank 18 of the lateral control mechanism 2.

The stabilizing apparatus 1 has two perpendicles, one of which (above called the lateral control perpendicle) comprising a gear 19, bridge 20, motor 21, centrifugal governor balls 22, a mercury globe 23 and a centrifugal ring 24. Parts of the second perpendicle corresponding with those just described in the first perpendicle are respectively designated 25, 26, 27, 28, 29 and 30. The motors 21 and 27 are intended to operate continuously while the aircraft is in flight, the resulting centrifugal action of the governors 22, 28 and rings 24, 30 maintaining the perpendicles in perpendicular positions so that should the aircraft tilt either laterally or longitudinally beyond a safe degree, the rack bars 31 and 32 will be shifted to change some of the electrical circuits either in Fig. 3 or in Fig. 2, depending on whether it was the lateral control rack bar 31 or the longitudinal control rack bar 32 that was shifted.

Assume that the aircraft tilts toward the right in the direction of the arrow $a$ (Fig. 1). The perpendicle 21 in seeking to re-establish itself in the perpendicular position, will shift the rack bar 31 toward the left in the direction of the arrow $b$ (Figs. 1 and 4) causing the left switch 33 (of which the right switch 34 is a counterpart) to reverse the direction of an electrical current through the left valve motor 35 (compare Figs. 3 and 4) of which the right valve motor 36 is a counterpart, thereby causing fluid under pressure to flow into the cylinder 37 (Fig. 5) of the lateral control mechanism 2. This fluid drives the piston 38 toward the right, moves the piston rod 39 in the same direction, shifts the arm 40 in a counter clockwise direction, the double crank 18 in the same direction (arrow $c$, Fig. 1) thereby pulling the cords 13 and 14, slackening the cords 12 and 15 so that the aileron 7 is lowered, the aileron 8 raised (dotted lines, Fig. 1) causing the right end of the aircraft to be elevated and thus restored to the former flying position.

An operation similar to the one described above takes place when the aircraft tilts either up or down beyond a predetermined safe degree. Assume that it tilts down in the direction of the arrow $d$ (Fig. 2). The perpendicle 27, seeking to maintain the perpendicular position, will shift the rack bar 32 rearwardly in Fig. 1 and to the left (arrow $e$) in Fig. 2, shifting the switch 41 (of which the switch 42 is a counterpart), reversing the flow of current through the valve motor 43 (of which the valve motor 44 is a counterpart) thereby admitting fluid under pressure to the cylinder 45, whereupon the arms 46 are rocked counter-clockwise (arrow $f$) the double crank 47 rocked in a similar direction (arrow $g$) causing a pull on the cords 48, 49 and a slackening on the cords 50, 51.

These cords are crossed as shown, and respectively connected to the upper and lower ends of double arms 52, 53 of the elevators 54. The pull on the cords 48 and 49 causes the elevators 54 to rock on their hinged mounting 55 until they assume the dotted line position. This position causes the aircraft to swerve upwardly so that it again seeks its normal flying position. The reverse operations of both the lateral and longitudinal control mechanisms involve similar parts which are associated with those described in the foregoing operations. These parts are described in detail below, beginning with the description of the stabilizing apparatus, which has a frame composed of channels 56 and end pieces 57. The end pieces have trunnions 58 which are made hollow for the purpose of the passage of wires as in Fig. 18. The trunnions are located below the center of the frame so that the shifting movement of the perpendicle 21 when it seeks the perpendicular position upon the lateral tilting of the aircraft, may more readily take effect on the rack bar 31. The trunnions are mounted in bearings on the end pieces of a base frame 59 which thus supports the entire automatic stabilizing apparatus.

The base frame 59 serves to set the entire stabilizing apparatus to conform to predetermined angles of ascent and descent of the aircraft. In other words, when the aircraft assumes a predetermined ascending angle, it is necessary to bring the stabilizing apparatus to a level so that it may properly function, and similarly, when it assumes the descending angle the apparatus must again be brought to a level for the same purpose. This changing of the position of the base frame 59 occurs only in ascending and descending, and for the purpose of making the changes provision is made of a lever 348 which has a connection 349 to a crank 350 on a suitably supported shaft 351 to which the side members of the frame 59 have fixed connection.

Recesses 352, 353 and 354 in a quadrant 355 designate the places to which the lever 348 must be moved in order to assume the ascending, descending and normal positions. Upon moving the lever 348 forwardly to engage the recess 352, the base frame 59 will be rocked toward the right to compensate for the ascending angle of the aircraft. When the lever 348 is moved to engage the recess 353, the reverse will be the case.

Referring again to the frame 56, experimentation has shown that the frame will rock far more readily when the trunnions 58 are placed below the center than when they are placed above, the former arrangement therefore being taken advantage of because quick action is desired in the stabilizing apparatus. The gears 19 and 25, mentioned in the preceding description, are semi-globular in shape because they must maintain their engagement with the teeth 60 and 61 of the respective rack bars 31 and 32 during both the lateral and longitudinal movements of the aircraft.

The teeth of the semi-globular gears 19 and 25 are disposed at right angles to each other (Figs. 1 and 9) so that one may slide in respect to its rack bar while the other grips the teeth of the other rack bar to shift it for the purposes mentioned above. For example, when the aircraft tilts toward the right (arrow *a*, Fig. 1) both perpendicles 21 and 27 will move together, as they always do, in seeking to re-establish their perpendicular position, the semi-globular gear 19 at such time shifting the lateral rack bar 31 by virtue of the gripping engagement with the teeth 60, the semi-globular gear 25, however, partaking of a sliding action in respect to the teeth 61 because of the right angular disposition of its teeth in respect to the gear 19. Should the aircraft tilt to the front or back, a reverse operation will result.

Ability for adjustment of the perpendicles 21 and 27 when the aircraft tilts longitudinally, is provided for by pivotally mounting the bridges 20 and 26 on the side channels 56 as at 62 (Figs. 1 and 5). Like the pivots of the frame 56, the pivots 62 of the bridges are located below centers so that the bridges and the associated parts may more readily be susceptible to longitudinal tilting movements of the aircraft. The bridges are joined by connecting rods 63 which have pivotal mountings 64 (Fig. 9) on each of the bridges. Each motor 21 and 27 is supported from the adjoining bridge by brackets 65 (Figs. 1 and 5) so that the motors are held in a rigid state.

The shaft 66 (using the motor 21 as an example) extends through at the bottom (Fig. 9) sufficiently far to enable screwing or otherwise fastening the mercury globe 23 in place. A sleeve 67 is disposed between the motor and the mercury globe, the sleeve having a plurality of ears 68 to which the arms 69 of the governor balls are pivoted. An equal plurality of dash pots 70 have spring-actuated plungers 71 which bear upon the arms 69 and are intended to enable lightening the weight of the governor balls and yet make it necessary to attain a high rotational speed before the governors assume the horizontal positions. The function of the governors 22 and 28 is to aid in keeping the perpendicles in the perpendicular position, and upon the slightest manifestation of the latter to leave such position, to immediately restore the balance of the perpendicles and cause them to resume the proper position.

This is accomplished by the action of the dash-pot plungers. These (as stated before) bear upon the governor arms so as to prevent them from raising higher than the horizontal. Now, should either perpendicle depart from the perpendicular it would in effect move closer to one side of the governor and thus upset the balance. The governor, being compelled by said dash-pot plungers to remain in the horizontal position, now drags the perpendicle back to the original perpendicular position and so restores the balance of the perpendicle which is necessary to the desired operation of the apparatus. It is to be noted in Fig. 9 that before the governors are set in motion, they rest in a position against the mercury globe as illustrated in dotted lines in the case of the governor 28 of the perpendicle 27. The plungers of the dash pots are then in such proximity as to immediately engage the governor arms and resist the tendency of the governor to reach the horizontal position upon the initial operation. It is not until a high speed is attained that the governor has overcome the dash pots sufficiently to enable it to assume the horizontal and operating position.

A quantity of mercury 72 is confined in the globe 23, this mercury moving up the wall of the globe under the influence of centrifugal action until it assumes substantially the position shown in dotted lines. Any tendency of the perpendicle to depart from the perpendicular position in which it is intended to stay, will tend to upset the balance established by the whirling mercury, whereupon the body of mercury will tend to gravitate toward the unbalanced side and so assist in pulling the perpendicle back to the aforesaid perpendicular position. The governor balls 22 and ring 24 serve to keep the perpendicle in the perpendicular position by centrifugal force, whereas the function of the mercury globe 23 is more intended to fulfill this function by the direction action of a gravitating substance. The globe 23 and ring 24 are connected by a universal joint 73 which aids the ring in keeping its horizontal whirling position should there be any tendency of the rest of the perpendicle toward departing from the perpendicular position.

Lateral tilting movements of the aircraft result in the shifting of the rack bar 31 through the medium of the perpendicle 21, as stated before, and to repeat the example given, a tilting movement toward the right will cause a movement of the rack bar 31 toward the left. This rack bar has a plurality of teeth 74 (Fig. 3) which are adapted to engage the single teeth 75 and 76 of the switches 33 and 34, depending on the direction in which the rack bar is shifted. In Fig. 4, the aircraft is shown as having tilted to such a degree as would bring the first of the teeth 74 (at the left) into engagement with the single tooth 75 of the switch 33. Should the plane tilt over still farther, the first tooth will move past and bring the second into engagement with the single tooth 75 and thus serve to keep the switch 33 shifted.

The purpose of this switch, as well as that of the switches 34, 41 and 42 (Fig. 2) is to reverse the direction of the flow of electrical currents through the valve controlling motors 35, 36, 43 and 44. Under normal flying conditions, current flows from the positive bus 77 (Fig. 3) over wire 78 to the rear contact 79 of switch 33, thence over wire 80 to the lamp 81, wire 82, through the movable arm 83 and resistances 84 of the rheostat 85, wire 86 to the arm 356 of the automatic rheostat 357 (Fig. 18), long contact 358, wire 359 to motor 35, returning via wire 87 rear contact 88 of the switch 33 and back to the negative bus 89 via wire 90. This passage of current keeps the motor 35 energized so that it tends to turn in the clockwise direction (looking down) as indicated by the dotted arrow in Fig. 7.

But this tendency of the motor 35 to rotate is checked by the engagement of a pin 91 on the motor shaft 92 with one side of a stop pin 93 which is fitted in the adjacent motor bearing 94. The motor 35 (as well as the other three valve motors) is enabled to make almost an entire revolution, advantage being taken of this feature to provide a cam 360 by means of which air is gradually admitted to the cylinder 37, the amount of air admitted depending upon the degree of rotation of the motor shaft.

A shifting of the switch 33 will reverse the direction of the flow of current through the motor 35 (Fig. 4) current then flowing from the positive bus 77 over wire 78 to the front contact 95 of the switch 33, over wire 96 to the lamp 97, wire 98 to the movable arm 99 of the rheostat 100, over the contacts and resistances 101 of the rheostat to the wire 102 to the motor 35, returning via wire 86, branch 103 to the other front contact 104 of the switch 33 and back to the negative bus 89 via wire 90.

This reversal of the current causes the motor shaft 92 to revolve in the direction opposite to the arrow in Fig. 7, so that, should the aircraft have tilted a great degree, the pin 91 will engage the other side of the stop pin 93 where it is checked. The almost complete revolution of the motor shaft thus represented, will serve to have gradually admitted air to the cylinder 37 so that the piston 38 will have been moved over about to the limit. If the aircraft tilts only to a slight degree, the reversal of current through the motor 35 will last but an instant before the original current direction is restored, whereupon the motor will promptly effect the shutting off of air to the cylinder 37. It will thus be seen that there will be periods in the operation of the stabilizing apparatus when the motor shaft 92 will turn more or less than at other periods, this being controlled by greater or less degrees of lateral tilting of the aircraft.

The varying points of cut-off of the valve motor 35 (and 36) determine various degrees of movement of the piston 38, and as the movements of the piston 38 determine the amount of tilting of the ailerons 7 and 8 (Fig. 1) it is imperative that the air be promptly cut off at the proper time so that excessive adjustments of the ailerons will not result. It is anticipated that the movements of the motors 35 and 36 (also 43 and 44 in the longitudinal stabilizing apparatus) are not fast enough to accomplish the desired quick response. Electro-magnetic cut-off valves 342 and 347 are therefore interposed in the supply air lines which lead to the respective pairs of valve motors. This valve (taking valve 342 in Fig. 3 as an example) is normally seated by a spring 343 to keep the air line to the valve motors closed. Energization of the electro-magnet 344 will unseat the valve to open the air lines and this energization occurs when the aircraft tilts either to the right or to the left, at which times current will flow through either shunt circuit 345 or 346 accordingly as switch 33 or 34 becomes operative.

Due to its ability to act quicker, the electro-magnetic valve 342 will open fully as the valve motor 35 begins to rotate, and again, due to its ability to act quickly, the valve 342 will close to shut off the air supply immediately upon reversal of the switch 33 (for example) when the aircraft starts to right itself. This may occur at a time considerably before the motor 35 begins to reverse, and it must be obvious to the reader that the shutting off of the air supply should not have to wait until the motor 35 is completely reversed but should occur promptly upon the beginning of the righting of the aircraft.

Mention has been made of the motor shaft 92 carrying a cam 360. This cam is intended to operate an air valve 105 to control the passage of air through an arrangement of longitudinal grooves 106. Communication between the left end of cylinder 37 and the atmosphere is had through an exhaust valve 107 which is normally kept open by an eccentric 361 on the shaft of the motor. Under normal conditions the valve 105 is kept closed by a spring 362. The eccentric 361 moves from beneath the stem of the valve 107 when the motor 35 is reversed, thus closing the exhaust passage a little before the valve 105 is opened to the pipe 108 of the compressed air tank 109.

Under the same normal flying conditions, current is furnished to the other lateral control valve motor 36, current flowing from the positive bus 77 (Fig. 3) over wire 110 to the rear contact 111 of the switch 34, thence over wire 112 to the lamp 113, wire 114 to the movable arm 115 of the rheostat 116, over the resistances and contacts 117 to the wire 363 to the arm 364 of the automatic rheostat 365, over the long contact 366 to wire 118 and the motor 36, returning via wire 119, rear contacts 120 of the switch 34, then over wire 121 to the negative bus 89.

Since the motor 36 is energized, the shaft 122 tends to turn but as in Fig. 7, is checked by the engagement of a pin 123 on the shaft with a stop pin 124 on one of the bearings 125 of the motor. The shaft 122 carries a cam 126 (Fig. 5) which is adapted to operate an intake valve 127 and also carries an eccentric 128 normally keeping the exhaust valve 367 open until a reversal of the motor 36, occurs as described in connection with the motor 35 in Fig. 6. The open exhaust valve 367 keeps the right end of the cylinder 129 (which is the counterpart of cylinder 37) in communication with the atmosphere.

A shifting of the switch 33 will reverse the direction of the flow of current through the motor 35 (Fig. 4) current then flowing from the positive bus 77 over wire 78 to the front contact 95 of the switch 33, over wire 96 to the lamp 97, wire 98 to the movable arm 99 of the rheostat 100, over the contacts and resistances 101 of the rheostat to the wire 102 to the motor 35 returning via wire 86, branch 103 to the other front contact 104 of the switch 33 and back to the negative bus 89 via wire 90. A reversal of the energizing current of the motor 36 occurs when the aircraft shifts toward the left instead of toward the right, as in the example just given. No illustration of this occurrence is made in the drawing, but the current flow at such time is over the following circuit:

From the positive bus 77 (Fig. 3) over wire 110 to the front contact 130 of the switch 34, wire 131 to the lamp 132, wire 133 to the movable arm 134 of the rheostat 135, over the contacts and resistance 136, wire 119 to the motor 36 whence the current returns via wire 118, branch 137, front contact 138 of the switch 34 and back to the negative bus 89 via wire 121. This reversal of the current in the motor 36 is accomplished by the shifting of the rack bar 31 toward the right and the consequent shifting of the switch 34 through the engagement of the first of the teeth 74 with the single tooth 76. The reader will have observed from the foregoing description that the automatic rheostats 357 and 365 (Figs. 3 and 18) are situated only in the normal energizing circuits of the motor 35 and 36.

Assume now that the aircraft has tilted to a marked degree toward the right (arrow a Fig. 1). The arms 356 and 364 of the automatic rheostats 357 and 365 being fixed on the hollow trunnions 58 of the frame 56, will both move toward the left, the arm 356 traversing a number of the contacts and resistances 368, the arm 364 moving farther over the long contact 366. The purpose of the resistances 368 (and 369 in the case of the rheostat 365) is to insure sufficient retardation in the reversal of the motor 35 and the accompanying closing of the valve 105 (Fig. 6) as to hold the ailerons 7 and 8 (Fig. 1) in their adjusted positions until the aircraft approximately reaches the righted position.

The reversal of the motor 35 and the closing of valve 105 is accelerated as the arm 356 traverses the contacts 368 toward the right, the left end of the long contact 358 extending far enough beyond the vertical center of the automatic rheostat 357 to insure the complete reversal of the motor and a consequent opening of the exhaust valve 107 at about the time that the aircraft reaches the corrected position, and thus prevent the possible chance of overrighting the aircraft. The same mode of operation is carried out in respect to the rheostat 365 when the aircraft tilts toward the left.

An indication of the flying position of the aircraft is given by the electric lamps on the panel 139 (Fig. 1), these lamps giving reference to the position of the aircraft so far as the lateral stabilization is concerned. A second panel 140 (Fig. 2) has another arrangement of lamps which indicates the flying position of the aircraft so far as longitudinal stabilization is concerned. Under normal flying conditions, the lamps 81 and 113 (Fig. 3) are lighted, the circuit over which current is furnished thereto having been described above. Situated in the middle of each panel 139 and 140 is a blue lamp 141 and 142. This lamp is intended to be lighted permanently by current from the main positive feeder 143, wire 144, branch 145, the current returning to the main negative feeder 146 via branch 147, wire 148. Similarly, the feeder 143 (Fig. 2) furnishes current to the lamp 142 via wire 149, returning to the negative feeder via wire 150.

The lighting arrangement described is adapted primarily for night flying, and by observing the panels 139 and 140 the pilot can ascertain whether the aircraft is flying level or not. Under normal conditions, the lamps 81 and 113 are lighted, the purpose of these lamps being to define a base line which indicates that the plane is level laterally. Should the aircraft tilt toward the right, the lamp 81 will become extinguished, due to the breaking of the circuit at the rear contact 79 (Fig. 3) and the lamp 97 will be lighted, due to the establishment of a new circuit at the front contact 95 (Fig. 4).

In order to suitably dim the lamps and obviate the glare in the eyes of the operator, a pane of glass 338 (Fig. 19) is suitably mounted over the lamps 81, 97, 132 and 113 and 141 of the panel 139. This pane is painted a dark color, leaving crossed arrows 339 and 340 clear. These arrows, and the corresponding lamps, are partitioned as at 341 so that either arrow will be illuminated upon lighting of the respective sets of lamps and thus clearly indicate to the operator the direction of inclination of the aircraft.

Accordingly, an inclination toward the right will be disclosed by the appearance of a diagonal arrow across the panel 139, formed by the lamps 97, 141 and 113, this arrow slanting in the direction toward which the aircraft is tilting. The blue lamp 141 serves the purpose of a pilot light in reference to which the other lamps on the panel become lighted to show the pilot that the aircraft is either on an even keel or is tilting to one side or the other. Should the aircraft tilt toward the left, the lamps 81 and 132 (Fig. 3) would appear lighted on the panel 139, illuminate the other arrow 339, and thus indicate to the pilot that the aircraft is tilting toward the left.

In order that the aircraft may be controlled automatically so far as longitudinal stabilization is concerned, an arrangement substantially identical with that disclosed in Fig. 3, is used. Under normal flying conditions, both valve motors 43 and 44 are energized, thus tending to turn in such a direction as will keep the associated air valves closed. The drawings do not show these air valves in detail, the showing in Fig. 5 (which belongs to the lateral control mechanism) being relied upon to acquaint the reader with the longitudinal control mechanism in Fig. 2 since both are identical in construction. Current for the normal energization of the motors 43 and 44 flows over the following circuits:

From the main positive bus 77 (Fig. 2) over wire 151 to the rear contact 152 of the switch 41, over wire 153 to the lamp 154 on the panel 140, over wire 155 to the movable arm 156 of the rheostat 157, over the contacts and resistances 158, and wire 369 to the arm 370 of the automatic rheostat 371 (see also Fig. 18) over the long contact 372, wire 159 to the motor 43 whence it returns via wire 160, wire 161, rear contact 162 of the switch 41, thence back to the negative bus 89 via wire 163.

Similarly, the motor 44 is energized by current flowing from the bus 77 over wire 164, rear contact 165 of the switch 42, wire 166, lamp 167 of the panel 140, wire 168 to the movable arm 169 of the rheostat 170, over the contacts and resistances 171 and wire 373 to the arm 374 of the automatic rheostat 375 (see also Fig. 18), long contact 376 to wire 172, through motor 44 whence it return via wires 173 and 174 to the rear contact 175 of the switch 42, thence back to the negative bus 89 via wire 176.

The lamps 154 and 167, together with the blue pilot lamp 142, remain lighted while the aircraft remains in the desired flying level, but should the aircraft tilt longitudinally, the pilot will be apprised of the danger by a change in the signal light, the lamps of the panel 140 having a covering pane arranged on the same order as the pane 338 over the panel 139 in Figs. 1 and 19.

For example, should the aircraft tilt downwardly toward the front, as indicated by the arrow $d$ in Fig. 2, the rack bar 32 will be shifted in the direction of the arrow $e$ as described before, bringing the first of a plurality of teeth 177 on top of the rack bar into engagement with the single tooth 178 of the switch 41, thereby shifting the switch in a manner precisely like that in which the switch 33 in Fig. 4 was shifted. Current will then flow over wire 151 (Fig. 2) front contact 179 of the switch 41, wire 180 to the lamp 181 on the panel 140, wire 182 to the movable arm 183 of the rheostat 184, over the contacts and resistances 185 and wire 186 to the motor 43, whence it returns via wire 159, branch 187 to the front contact 188 of the switch 41 and returning to the negative bus 89 via wire 163.

Under this circumstance, the lamps 181, 142 and 167 would be lighted on the panel 140 and indicate to the pilot that the aircraft was tilting downwardly at a dangerous angle. The lamp 154 becomes extinguished at the breaking of the circuit at the rear contact 152 of the switch 41.

The foregoing reversal of the current through the motor 43 will cause the opening of the associated valve 189 so that pressure fluid flows into the cylinder 45 (Fig. 2) and drives the piston 190 toward the right so that the arms 46 are shifted in the counterclockwise direction (arrow $f$) and the elevators 54 are moved into the dotted line positions as already described above. But before air can enter the valve 189 it is necessary that the electro-magnetic opening valve 347 (described before in connection with the valve 342 of Fig. 3) be opened, such opening having occurred upon the energization of the shunt circuit 377 from the circuit which was completed across the front contacts 179 and 188. The completion of a similar circuit by the switch 42 closes another shunt circuit 378, again for the purpose of opening the electro-magnetic valve 347 and in turn to open the air line to the valve of motor 44.

Should the aircraft tilt in the opposite direction, that is to say, down at the rear, the reverse actions would take place, current then flowing from the main positive bus 77 over wire 164 to the front contact 191 of the switch 42 (the rack bar 32 being presumed to have been moved toward the right and the switch 42 to have been shifted) over wire 192 to the lamp 193 on the panel 140, over wire 195 to the movable arm 196 of the rheostat 197, over the contacts and resistances 198 and wire 173 to the motor 44, whence it returns via wire 172, branch 199, front contact 200 of the switch 42 and then back to the negative bus 89 via wire 176.

It is readily seen that under this circumstance the arrow indicated across the panel 140 by the lamps 193, 142 and 154 will be inclined oppositely to the one formerly described and will indicate to the pilot that the plane is tilting toward the rear. The lamp 154 remains lighted because the original circuit through the motor 43 remains undisturbed at the rear contact 152 of the switch 41 when the rack bar 32 is shifted toward the right. For the same reason, the lamp 167 remains lighted when the rack bar 32 is shifted toward the left (arrow *e*). The lamps 181 and 193 are lighted only when the circuits of the respective motors 43 and 44 are reversed.

Provision is made for the utilization of the signal panels 139 and 140 even after the apparatus has been shifted into manual control, at which time all of the electrical devices, as well as the fluid-actuated mechanisms, are disconnected and therefore incapable of operation. Both blue lamps 141 and 142 remain lighted under this circumstance, since these lamps draw current from such places in the main feeders 143 and 146 as would not be affected by the shifting of either auxiliary clutch lever 201 or 202. These auxiliary levers control the entrance of electrical current from the main feeders 143 and 146 to the busses 77 and 89 over the lateral and longitudinal stabilizing apparatuses respectively.

For this purpose, the auxiliary lever 201 has a contactor 203 which in the normal flying condition under automatic control engages the contact 204 (Fig. 3) and establishes a flow of current from the main positive feeder 143, wire 205, contacts 203 and 204, and wire 206 to the positive bus 77, the current returning from the negative bus 89 via the main negative feeder 146 when any of the various electrical devices, connected in parallel across the busses, is closed. In shifting the auxiliary lever 201 for manual control, the contactor 203 will engage the contact 207, thereby partially closing a circuit from the main positive feeder 143, wire 205 and contacts 203, 207 to the wire 208. This wire embraces lamps 209 and 210 from which wires 211 and 212 run to roller contacts 213 and 214. Companion roller contacts 215 and 216 have connections 217 and 218 to the negative bus 89.

Contact strips 219 and 220 are insulatively mounted on the respective ends of the rack bar 31, the purpose of these strips being to bridge the gap between the contacts 213, 215 or 214, 216 and complete the circuit which was partly completed at the contact 207 by throwing over the auxiliary clutch lever 201.

Assume the clutch lever to have been thrown into this position and the aircraft to be under manual control none of the electrical devices (excepting the motors 21 and 27, and the lamps 141 and 142 which must be maintained at all times) are now in operation. Assume that the aircraft has tilted toward the right (arrow *a*, Fig. 1) this resulting in shifting the rack bar 31 toward the left. Upon bridging of the contacts 213, 215 by the strip 219, current will flow from the main positive feeder 143 over wire 205, contacts 203 and 207 to wire 208, through lamp 209, over wire 211 and over contact members 213, 219 and 215 to the wire 217 thence back to the negative bus 89 and negative feeder 146. The pilot will see the illuminated lamps 141 and 209 only but this illumination represents enough of a diagonal line to indicate to him that the aircraft is tilting downwardly toward the right. A similar indication (reversed) would be obtained by a lateral tilting of the aircraft toward the left, at which time the lamps 141 and 210 would be illuminated.

According to a similar plan, electrical signals indicating the position of the aircraft in reference to its longitudinal stabilization, are given, while under manual control. The panel 140 (Fig. 2) has lamps 221 and 222 which are respectively lighted when the strips 223 or 224 bridge the adjoining contacts 225, 226 or 227, 228. When the aircraft is flying under automatic control, the contactor 229 on the auxiliary clutch lever 202 (Fig. 2) is in engagement with a contact 230, thereby completing a circuit to the busses 77 and 89 from the main positive feeder 143 via wires 231 and 232. But when the aircraft is under manual control the lever 202 assumes a position that is shifted from the position illustrated in Fig. 2 so that the contactor 229 engages a contact 233 which partially closes a circuit embracing the lamps 221 and 222.

Connection is made between these lamps and the contact 233 by a wire 234, the respective lamps being connected to the contacts 226 and 228 by wires 235 and 236, respectively. The contacts 225 and 227 are connected to the negative bus 89 by wires 237 and 238. Assume that the aircraft tilts longitudinally in the direction of the arrow *d* in Fig. 2 while under manual control. The rack bar 32 will move toward the left (arrow *e*) bridging the contacts 225 and 226 by the strip 223 so that current will flow from the main feeder 143 over wire 231 to the contactor 229, contact 233, wire 234, lamp 221, wire 235, contact members 226, 223 and 225 to the wire 237, negative bus 89 and back to the negative feeder 146.

The lamps 221 and 142 will now be illuminated before the pilot and will represent enough of a diagonal line to indicate that the aircraft is tilting forwardly in the longitudinal direction. A similar result is obtained when the aircraft tilts rearwardly in the longitudinal direction, at which time the lamp 222 will become illuminated by virtue of the bridging of the contacts 227 and 228 by the strip 224 by the movement of the rack bar 32 to the right.

A red signal lamp 239 on the panel 140 is intended to be lighted only when the aircraft tilts in the direction of the arrow $d$ (Fig. 2) to an extremely dangerous degree. This lamp is controlled by a pair of contacts 240 which are intended to be bridged by the strip 223 when the aircraft assumes a position such as described. At such time, current will flow from the main positive feeder 143 over wire 231, contact 233, wire 234, lamp 239, wire 241, past the contacts 240 (which are presumed to be bridged by the strip 223), and wire 242 to the negative bus 89. Since the lamp 221 is in circuit with the lamp 239 it too will be lighted, but this is of no disadvantage since the indication given will be that of the forward and downward tilting of the aircraft, the two lamps 221 and 239 being read together with the blue lamp 142 and as one of the components of the imaginary line between the lamps.

The construction of one of the valve motor reversing switches is shown in detail in Figs. 13 and 14, the switch 33 being selected for description as all of the other switches 34, 41 and 42 are identical in construction and mode of operation. A pair of disks 243 and 244 is fixed on a shaft 245 by means of keys 246 or otherwise, the shaft in turn being fixed on a suitable bracket 247 which must be made so as to reach an adjacent place of support. No attempt at an accurate illustration of either the construction of the bracket or the place of support has been made, other than to give a general idea as to what the arrangement should be like (Fig. 10).

A disk 248 revolves on the shaft 245 in the space between the fixed disks 243 and 244, the revoluble disk carrying oppositely directed pairs of brushes 249, 250 and 251, 252. These brushes cooperate with the pairs of rear contacts 79, 88 and pairs of front contacts 95, 104, as were described in connection with Figs. 3 and 4. The brushes are pressed outwardly by springs 253, and substantially the whole structure of each pair of brushes is enclosed by a copper casing 254 to which the wires 78 and 90 are respectively connected.

A pair of coil springs 255 and 256 are provided for the purpose of keeping the revoluble switch disk 248 in the normal position indicated in Fig. 3 when the single tooth 75 is free of the teeth 74 on the rack bar 31. One end of each of these springs is fastened into an adjacent disk 243, 244, the other end of each spring being formed into a hook 257 for engagement by hook-shaped pins 258 and 259 on opposite sides of the revoluble disk. The hooks 257 are disposed in opposite directions, the object being to catch one spring and depart from the other when the disk 248 revolves in one direction and vice versa. The revoluble disk is always under spring tension, and when the tooth 75 is freed, the tendencies of the springs 255 and 256 are to balance the revoluble disk and hold it in such position that electrical contact is made with the rear contacts 79 and 88 as described before.

Adjustments of the rheostats 85, 100, 116 and 135 (Figs. 3 and 4) are made by a single knob 260 on the electric light panel 139. Figs. 3 and 4 show two adjusting knobs but this showing is made merely for the purpose of aiding the construction of the diagrams and is not intended to be carried out in actual practice, the correct arrangement being shown in Fig. 11. Here the knob 260 is shown connected with a gear 261 with which the plantary gears 262, 263, 264 and 265 mesh. These gears carry the arms 83, 99, 115 and 134 of the various rheostats described in connection with Figs. 3 and 4, it being obvious from the construction shown that a turn in either direction of the knob 260 will adjust the various rheostats so as to either increase or diminish the amount of current which it is intended shall pass through.

The lateral control mechanism which has already been partly described in connection with the stabilizing apparatus in Fig. 1, comprises a pair of opposed pressure cylinders 37 and 129 (previously described) at the outer ends of which are located pairs of automatic quick-release valves 266 and 267. The respective pairs of valves have common pipe connections 268 and 269 with the cam chambers 270 and 271 of the valves 105 and 127. Interposed in the pipe connections 268 and 269 are electro-magnetic closing valves 379 and 380 which are normally open and do not come into play to close the pipe connections until the emergency control (Fig. 15) is brought into operation. The purpose in providing duplicate valves 266 and 267 is to effect a quick and complete release of the pressure fluid when one or the other of the valves 105 and 127 is closed after having been opened by a reversal of the current in the associated motor to admit fluid into the cylinder for the operation of the piston.

Although the valves 266 and 267 are not a part of this invention, the construction and mode of operation should be understood. Each valve has a disk 272 which is held up against the head 273 of a second valve 274 by a spring 275. The second valve controls the air outlet 276 and is normally held thereon by a spring 277. Assuming the valve 105 (Fig. 6) to be opened, air or other pressure fluid will enter each valve 266 and pass through openings 278 in the disk 272 into the left end of the cylinder 37. Upon the closure of the valve 105, the fluid still under pressure in the cylinder 37 will act on the lower face of each disk 272 and tend to lift both the disk and the valve 274 so that the fluid may make a quick escape at the openings 276. Any residual air in the left end of the cylinder 37 will find its way to the atmosphere by way of the exhaust opening 107 after the valve 274 has become seated.

The rod 39 (Fig. 5) which connects the piston 38 with a similar piston 279 in the cylinder 129, carries a sleeve 280 with trunnions 281 which operate in slots 282 of the arms 40 and thus act to rock the countershaft 283 (Figs. 1 and 8) through the countersleeve 284 and clutch 285 when the rod 39 is shifted in either direction. The countershaft 283 carries the double crank 18 (Fig. 1) to which the cords 12, etc. are joined. The shaft 283 also carries another set of double cranks 286 through which the shaft and cranks 18 are rocked by manual effort when the clutch 285 has been moved away from the countersleeve 284.

The auxiliary clutch lever 201 (described in connection with the diagram in Fig. 3) which shifts the clutch 285, is actuated by a lever 287 (Fig. 1) beside the operator. This lever has a connection 288 with the auxiliary clutch lever, and the three adjustments of which the lever 287 is susceptible, are intended to be fixed in the recesses 289, 290 and 291 on the quadrant 292 by the detent 293. These recesses respectively represent the clutched-in, idle, and manually controlled positions of the stabilizing apparatus.

T-bars 294 (Figs. 5 and 8) are intended to support and brace the rod 39 by engagement in grooves in the countersleeve 280. These bars are fastened between the ends of the cylinders 37 and 129. They not only assist in bracing the rod 39, but what is more important, prevent the rod from turning and thereby obviating the possibility of the trunnions 281 becoming disalined with the slots 282.

Springs 295 and 296 in the respective cylinders serve to return the respective pistons to approximately central positions in the cylinders and keep them there under normal conditions.

The longitudinal control mechanism is the same as the lateral control mechanism in every respect and a detailed illustration such as Fig. 5 is therefore omitted from the drawings. The reader can readily associate the following brief description of Fig. 2 with the structure in Fig. 5 and so obtain a clear understanding of the internal structure. The rod 190 has a piston on each end, one piston operating in the cylinder 45, the other operating in a cylinder 297. Pairs of automatic quick release valves 298 and 299 are situated at the ends of the respective cylinders, pressure fluid being conducted therethrough by pipes 300 and 301 from the valves 189 and 302. These pipes (like pipes 268 and 269) have electro-magnetic closing valves 381 and 382 which form part of the emergency control in Fig. 15. These valves are normally open so that air may pass through the pipe connections.

The rod 190 has a sleeve 303 with trunnions 304 which operate in slots of the arms 46 so as to rock the countershaft 305 when the counter sleeve 306 is fixed to the shaft by the clutch 307. This clutch is shiftable by the auxiliary lever 202, this lever being actuated by a lever 308 beside the operator, there being a bell crank and rod connection 309, 310 between the two levers. The detent 311 will lock the lever 308 into either the clutched-in idle or manually controlled positions of the stabilizing apparatus, respectively represented by the recesses 312, 313 and 314 of the quadrant 315. This quadrant is fixed on a rod 316 to which the quadrant 292 of the lateral control mechanism (Fig. 1) is also fixed.

The manual control mechanism has a direct bearing on the invention to a limited extent only, i. e. the lateral and longitudinal control mechanisms might be rendered entirely inoperative so that the utmost freedom of operation of the manual control mechanism may be attained when desired. This mechanism essentially comprises the hand lever 317 (Figs. 1 and 2, in which both levers shown are supposed to be one and the same) which is pivoted at 318 so that the lever may be rocked back and forth longitudinally for the purpose of actuating the elevators 54 through the medium of cords 319 and 320 which in turn are connected to a double crank 321 on that end of the counter shaft 305 which is opposite to that on which the double crank 47 is secured. A handle 322 is provided to facilitate grasping the lever 317 for accomplishing the movement described.

A hand wheel 323 has a drum 324 on which a cable 325 is wound, the ends of this cable being attached to the double crank 286 of the counter shaft 283 (Fig. 1) after passing over rollers 326 for the purpose of shifting the ailerons 7 and 8 and thus effecting the lateral control of the aircraft. As shown in detail in Fig. 12, the hand wheel and drum are made substantially integral and have free movement on a shaft 327 which is made rigid both in respect to the lever 317 and handle 322 by a key which is common to both.

Provision is made for placing the extreme ends of the pressure cylinders 37, 129 (Fig. 5) 45 and 297 (Fig. 2) in direct communication with the atmosphere when the aircraft is under manual control, instead of depending on the circuitous path through the valves 266 etc. (Fig. 5) pipes 268 etc. and valve 107 etc. to take care of the ejection and induction of air upon the reciprocation of the pistons 38 etc. This provision consists of a valve 328 which is situated beside the pilot (Fig. 1) so that the operating handle 329 may be within easy reach.

Under normal conditions, i. e. when flying under automatic control, the port 330 is in a position to establish communication between the fluid pressure tank 109 and the pipes 108 and 331 which distribute the fluid to the various valves 270, etc. of the two control mechanisms, while the port 332 is out of communication with the system of pipes 333 which is common to all of the relief valves 334 situated at the outer ends of the various cylinders 37, etc.

Each of the valves 334 comprises a double headed plunger 335 which is held down by a spring 336 to close the exhaust opening 337. Upon turning the handle 329 of the valve 328 in the counter clockwise direction (looking down), the port 332 is brought into communication with each of the adjoining pipes 333 and fluid under pressure is conducted past the port 330 into these pipes so that the plungers 335 are lifted and direct communication between the outer end of each cylinder and the atmosphere is established through the exhaust port 337. The port 330 of the valve 328 is so arranged that the turning of the handle 329 as described, will close the air pipe 108 at the left of the valve but leave the right end of this pipe open to the tank 109. The plunger 335 is intended to move up only far enough to uncover the exhaust port 337, the pressure beneath the lower head of the plunger maintaining this valve open as long as the handle 329 remains shifted.

The reader will readily see that the provision of the valves 334 is necessary because in controlling the aircraft manually, the pilot is compelled to shift the pistons 38, 279, and the pistons in the cylinders 45 and 297 (Fig. 2) with each movement of the hand levers 317 and hand wheel 323, and it is therefore essential that no impediment to the easy movement of these pistons be left in the way. While the circuitous path through the valves and pipes at the end of each cylinder might properly take care of the column of air set in motion by the movement of these pistons, yet as a precautionary measure it is thought wise to provide the relief valves 334. Although the operations of the stabilizing apparatus, the lateral control mechanisms and the manual control mechanism can be comprehended from the description of the various constructions above.

An emergency control is provided primarily for the purpose of managing the aircraft should the air valves 105, 127, motors 35 and 36 (Fig. 5) or valves 189, 302, motors 43 or 44 (Fig. 2) fail for such reasons as sticking, burning out, breaking of connections, etc. But the emergency control is not confined to this use alone, as it may be used as an auxiliary to the automatic control and may be brought into operation while the automatic control is functioning properly in every respect.

Suitably mounted upon the hand lever 317 are pairs of air valves 383, 384 and 385, 386 (Fig. 15) which are disposed on the front and sides of the lever so as to more nearly correspond with the locations of the longitudinal and lateral control mechanisms with which they are intended to cooperate. The respective valves have flexible air pipes 387, 388, 389 and 390 which lead to the air connections 300, 301, (Fig. 2) and 268, 269 (Fig. 5) of the longitudinal and lateral controls.

Air is supplied to all of these valves by a common connection 391 which has branches to the various valves (Fig. 15). The handle of each of the valves has an insulated contactor 392, 393, 394 and 395 (Fig. 17) which contactors respectively have electrical connections 396, 397, 398 and 399 to one side of the solenoid windings 400 (Fig. 16) of the electro-magnetic closing valves 381, 382, 379 and 380 in the air connections 300 etc. mentioned before.

The other sides of the solenoid have connections 401, 402, 403 and 404 to a common positive wire 405 leading to a source of electrical supply arbitrarily indicated B, the connection in practice undoubtedly being to the main positive bus 143 (Fig. 2) which amounts to the same thing. Upon opening of any of the valves 383, etc. the contactors 392, etc. of the respective valves are adapted to engage insulated contacts 406, 407, 408 or 409, these respectively having connections 410, 411, 412 and 413 to a common negative wire 414 which leads to the negative side of the source of electrical supply.

Upon opening the valve 383 (for example) an electrical circuit is instantly established through the winding 400 of the electro-magnetic closing valve 381 so that that valve closes the connection 300 between the air valve 189 and the pipe 387 from said valve 383. Substantially simultaneously with the closing of valve 381 air is admitted from the common air connection 391 (Fig. 15) into the left end of cylinder 45 (Fig. 2) so as to drive the piston in that cylinder forwardly for the elevation of the rudders 54, it being this particular air valve (383) which controls the elevation of these rudders.

The air valve 384 controls the depression or lowering of the rudders 54, and an operation identical with the one described in connection with valve 383 will occur upon opening of valve 384. The air valve 385 controls the lateral rocking of the aircraft in the direction opposite to the arrow $a$ in Fig. 1, while the air valve 386 controls the lateral rocking of the aircraft in the direction of the arrow $a$.

The necessity of the electro-magnetic closing valves 381, etc. is apparent to the reader. Were it not for these valves the introduction of compressed air into the connections 300, etc. via pipes 387, etc. would result in the escape of probably the major portion of the compressed air at the normally open (to atmosphere) valves 189, 302, 107 and 367. Upon closing of any of the valves 385, etc. the corresponding electro-magnetic valves 381, etc. will immediately open, springs (Fig. 16) being provided for that purpose, the now open electro-magnetic valves re-establishing the continuity of the connections 300, etc. so that the automatic stabilizing apparatus may function should it have so happened that the emergency control was brought into play while the automatic stabilizing apparatus was fully functioning.

In using the emergency control it may be desirable or necessary to turn the single-pole double-throw switches 415 and 416 into the dotted line positions in Figs. 2 and 3. Under normal flying conditions, these switches assume the full-line positions, bridging the gap in the positive wire 77 and closing the circuit therethrough. But when the operator voluntarily or necessarily makes use of the emergency control and desires to cut out the automatic indicating lamps on the panels 139 and 140, the switches 415 and 416 must be thrown to partially close branch-circuits 417 and 418.

These circuits respectively embrace the manual control lamps 221, 222 on panel 140, and 209, 210 on panel 139, and when the rack bars 32 or 31 shift a circuit through one of the four lamps is completed at the contacts 225, 227, 215 or 216, depending on how and which one of the rack bars is shifted. For example, should the rack bar 32 shift in the direction of arrow $e$, a circuit including wire 77, switch 41 and wires 417, 234 and 237 will be closed at contacts 223 and 225, causing the lighting of lamp 221 and giving an indication of a downward inclination of the aircraft.

A résumé of the operation is here appended so that the reader may gain a quick knowledge thereof without referring to the detailed description. The aircraft is capable of operating under any one of a number of modes of control: automatic, when the levers 287 (Fig. 1) and 308 (Fig. 2) are drawn back into the last recesses 289 and 312, at which times the electrical circuits in Figs. 2 and 3 are closed; manual, when the levers 287 and 308 are moved forwardly into the recesses 291 and 314, when most of the circuits in Figs. 2 and 3 are opened; emergency, when the air valve mechanism in Fig. 15 is brought into use, such use occurring either when any of the valve motors 35 etc. are disabled or when the operator simply desires to make use of the emergency control while the automatic control is operating perfectly.

In addition to these modes of control, the angle-setting base frame 59 in Fig. 18 may be employed to set the rudders 54 so that the desired ascending angle of the aircraft may be obtained. It is merely mentioned that the angle-setting frame may be employed for this purpose, the fundamental purpose, however, of this frame being to station the stabilizing apparatus at horizontal levels while making prolonged ascending or descending flights. Permanent examples of this use of the angle-setting frame 59 are when ascending or descending at night. It obviously is just as important to keep the aircraft on an even keel while ascending or descending as it is when flying on a level, and when the base frame 59 is adjusted to the horizontal plane, (assuming the aircraft to be ascending or descending) the signal panels 139 and 140 will function to apprise the operator of any deviation laterally or longitudinally in the same manner as when flying straight away, as stated before.

Reverting to the use of the angle-setting frame 59 as a means for causing the aircraft to either ascend or descend, a movement of the lever 348 (Fig. 18) toward the rear recess 353 will cause the frame 59 to move up at the front and down at the rear, whereupon an operation of switch 42 in Fig. 2 will result, causing the reversal of motor 44, an influx of air into the cylinder 297 and a movement of the double crank 47 in a direction opposite to the arrow $g$, thereby depressing the elevating rudders 54 and causing the aircraft to assume a descending position. When this position is once assumed, the base frame 59 will in turn assume a horizontal position in respect to the surface of the earth below but will still remain at an angle to the longitudinal axis of the aircraft.

The changing of the longitudinal axis of the aircraft from the horizontal flying position to the angular descending position causes a movement of the perpendicle 27 such as will enable the switch 42 (Fig. 2) to assume its original position, at which time the motor 44 will operate to cause the release of air from the cylinder 297 and thus enable the elevating rudders 54 to assume their original positions. In the first of the above instances of control, the lamps 97, 113 (Fig. 4) and 81, 132 (Fig. 3) cooperate with the central blue pilot light 141 in indicating the laterally shifted positions of the aircraft (see Fig. 4 for an example), while the lamps 181, 167 (Fig. 2) and 154, 193 perform a similar function in respect to the central blue pilot light 142 in indicating the longitudinally tilted positions of the aircraft.

These lamps are utilized mainly in night flying but they also are used in the daytime as they act as an indication of the conditions under which the stabilizing apparatus is acting and serve as an indication as to whether it is operating correctly. The foregoing sets of lamps (excepting the blue pilot lamp) cease to function when the clutch levers are shifted into manual control, but the advantage of signal light is gained by the use of the lamps 209, 210 and 221, 222 (Figs. 3 and 2 respectively) is retained, these lamps cooperating with the blue pilots 141 and 142 in indicating the four tilted positions of the aircraft. These lamps are utilized when flying under manual control at night. Moving the levers 287 (Fig. 1) and 308 (Fig. 2) into the mid-recesses 290 and 313 severs all electrical connections with the control apparatuses in Figs. 3 and 2 with the possible exception of the perpendicle motors 21 and 27 and the companion pilot lamps 141 and 142 which are intended to be energized at all times unless the current is disconnected at the source ends of the feeders 143 and 146.

Assume the aircraft to be under automatic control and tilting toward the right (arrow $a$ Fig. 1). Both gyro-perpendicles 21 and 27 tend to maintain a perpendicular position at all times by virtue of the centrifugal action of the governors 22, 28, the rings 24, 30 and the mercury in the globes 23, 29 (Fig. 9). The aforesaid tilting movement of the aircraft will result in shifting the rack bar 31 toward the left (arrow $b$) while the gear 25 of the other rack bar 32 will simply slide in respect to the teeth 61 (Figs. 1 and 9) by virtue of the right angular disposition of the gears 19 and 25 of the respective perpendicles.

Shifting the rack bar 31 toward the left revolves the switch 33 (Fig. 4) so that the circuit which formerly flowed in one direction through the motor 35 is reversed and thereby caused to flow in the opposite direction. Where the valve 105 of the motor 35 was formerly closed, the natural result of the reversal of the current through the motor is to open the valve 105 so that air is admitted from the tank 109 into the left end of the cylinder 37, forcing the piston 38 toward the right (Fig. 5), the double crank 18 in the counter-clockwise direction (arrow $c$, Fig. 1), pulling on the cords 13 and 14 and tilting the ailerons 7 and 8 into the respective dotted line positions. The result of this tilting is to right the aircraft.

Assume the aircraft to be tilting downwardly in the longitudinal direction (arrow $d$, Fig. 2). The perpendicles 21 and 27 will now swing forwardly in keeping the perpendicular position, so that the gear 25 becomes operative in shifting the rack 32 rearwardly (Fig. 1) or toward the left (arrow $e$, Fig. 2), while the gear 19 simply slides in respect to the teeth 60 of the rack bar 31. This movement of the rack bar 32 revolves the switch 41 so that the current which formerly flowed through the motor 43 in one direction is reversed to flow in the opposite direction, again causing the opening of the associated valves so that air or other fluid under pressure is admitted to the left end of the cylinder 45, driving the piston rod 190 outwardly and rocking the arms 46 in the direction of the arrow $f$. This in turn rocks the double crank 47 in the direction of the arrow $g$, pulling on the cords 48, 49 and moving the elevators 54 into the dotted line positions. The result of this action is again to right the aircraft.

Assume the aircraft to be under manual control. The pilot should first move the handle 329 of the valve 328 (Figs. 1 and 5) in the counter-clockwise direction so as to sever communication of the pressure in the tank 109 with the pipes 108, 331, by means of which the fluid under pressure is furnished to the various motor valves of the lateral and longitudinal control cylinders. This shifting of the valve 328 transfers the pressure into the pipes 333, whereupon the valves 335 are opened and immediate access of the atmosphere with the interior of the extreme ends of the control cylinders is had.

This is necessary to enable the free movement of the various pistons 38, etc. (Fig. 5) when the lever 317 (Figs. 1 and 2) is shifted or the hand wheel 323 is rotated. The lever and hand wheel respectively control the elevators 54 and ailerons 7 and 8, the manner in which this is done being readily ascertained from Figs. 1 and 2 without further description. In setting the apparatus for manual control, it is necessary to shift the clutch levers 287 and 308 into the forward recesses 291 and 214 so that the switch (33, etc.) and motor (35 etc.) circuits are broken, only the motors 21 and 27 of the perpendicles remaining in the running condition because it is still necessary to take advantage of the shifting movement of the rack bars 31 and 32 to control the illumination of the signal lamps 209, 210 (Fig. 3) and 221, 222 (Fig. 2) by the bridging of contacts 213, 215, etc.

While the construction and arrangement of the improved aircraft control apparatus as herein described and claimed, is that of a generally preferred form, obviously other modifications and changes may be made without departing from the spirit of the invention or the scope of the claims.

I claim:—

1. In combination with the stabilizing means of an aircraft, mechanism with connections to said means for the operation thereof, a source of pressure fluid, a source of electrical energy, electro-mechanical means adapted to cause the introduction of said fluid into said mechanism, an automatic control adapted to direct said electrical energy to actuate said electro-mechanical means according to deviations of the aircraft and cause the restoration thereof through corresponding functioning of said pressure-fluid mechanism, and an emergency control in connection with said fluid source adapted for manual operation to actuate said fluid mechanism independently of said electro-mechanical means to compensate for said deviations in the aircraft even while the functions of said automatic control are complete.

2. In combination with the stabilizing means of an aircraft, means by which said stabilizing means may be manually operated, including a shaft with connections to the stabilizing means; a sleeve loose on the shaft, means to clutch or unclutch the sleeve from the shaft, pressure fluid-operated mechanism having connections to move the sleeve, and a perpendicle which is susceptible to deviations of the aircraft from the flying plane, adapted to cause the introduction of fluid into said mechanism for the movement of the sleeve and automatic operation of the stabilizing means when said clutch means effects a connection between the sleeve and shaft.

3. In combination with the stabilizing means of an aircraft, a shaft having connections to said stabilizing means for the operation thereof, a manual control device having connection to the shaft, a clutch splined to the shaft, a sleeve loose on the shaft and from which the clutch is disengaged from the manual control, fluid-pressure operated mechanism including a reciprocable element in connection with members which are pendent from the sleeve, means by which fluid is admitted to such mechanism for the operation of said sleeve when clutched to the shaft, and a perpendicle which is susceptible to deviations in the aircraft from the flying plane and adapted to govern the operation of said fluid admission means thus placing the aircraft under automatic control.

4. In combination with the stabilizing means of an aircraft, means for controlling said stabilizing means automatically, said means including a perpendicle, electric switch devices which are actuated by the perpendicle when the aircraft deviates from the flying plane, an arrangement of signal lamps under control of said switch devices to indicate the direction of deviation of the aircraft, means by which the stabilizing means may be controlled manually upon deviations of the aircraft, means by which a shifting from one mode to the other mode of control is accomplished, another arrangement of signal lamps, and means associated with said shifting means for bringing the last set of lamps in operation to accompany the manual control and render the first arrangement of lamps inoperative with the automatic control.

5. In combination with the stabilizing means of an aircraft, mechanism with connections to said stabilizing means for the automatic operation thereof, a perpendicle which automatically functions upon deviations of the aircraft from the flying plane to cause the operation of said mechanism, electrical circuits and switch devices associated with the perpendicle and arranged to be energized and actuated thereby, an arrangement of signal lamps in a part of said circuit adapted to be lighted in a predetermined manner according to the deviations of the aircraft, means by which the stabilizing means may be operated by manual effort, signal lamps in another part of said circuit also adapted to be lighted according to deviations of the aircraft when under manual control, means which is to be shifted so as to free the manual control of the automatic mechanism, and a switch device associated with said shiftable means to isolate the aforesaid switch devices of the perpendicle and the corresponding signal lamps and place the manual signal lamps in circuit.

6. In combination with a stabilizing means of an aircraft, mechanism with connection to the stabilizing means for the operation thereof, means for automatically controlling the operation of said mechanism upon occurrence of deviations of the aircraft from the flying plane, said means including a perpendicle, a member which is shifted by the perpendicle upon said deviations, switch devices and circuits which are manipulated by said shiftable member to control said mechanism, an arrangement of signal lamps which are lighted by said switch devices in accordance with said aircraft deviations, means to manually control said stabilizing means, means which is movable to free the manual control of said automatic mechanism, an arrangement of signal lamps for the manual control, and switch means associated with said movable member to place the manual control lamps in circuit and the aforesaid switch devices out of circuit so that further shiftings of said shiftable member by the perpendicles will have no effect upon the accompanying arrangement of signal lamps.

7. In combination with the lateral and longitudinal stabilizing means of an aircraft, pressure fluid-operated mechanisms for controlling the respective stabilizing means, means associated with each mechanism for controlling the admission of fluid, a pair of perpendicles respectively susceptible to lateral and longitudinal deviations in the aircraft and having means to correspondingly actuate the fluid controlling means of one or the other mechanism, an emergency control including means by which the fluid may be introduced into said mechanisms by manual effort independently of the aforesaid fluid controlling means, and means associated with said emergency control for cutting off communication of said fluid with said fluid-controlling means during introduction into said mechanisms.

8. In combination with the lateral and longitudinal stabilizing means of an aircraft, separate fluid pressure-operated mechanisms to actuate the respective stabilizing means, electro-mechanical means to control the admission of fluid into the respective mechanisms, a pair of perpendicles respectively controlling electrical circuits to operate one or the other fluid controlling means depending on whether the aircraft tilts laterally or longitudinally, an emergency control having manually operated means for controlling the flow of fluid into said mechanisms independently of the fluid controlling means, and electrical means associated with said emergency control for severing the communication of the fluid with said controlling means when the emergency control is operated.

9. In combination with the stabilizing means of an aircraft, a fluid pressure-operated mechanism for operating said stabilizing means, a source of fluid supply, a valve for controlling the flow of fluid into said mechanism and being normally closed to said source but offering communication between said mechanism and the atmosphere, means for automatically reversing the position of the valve upon tilting of the aircraft, said means including a perpendicle with operating connections to the valve, an emergency control including a manually operated valve for introducing fluid into said mechanism independently of the aforesaid valve, and means associated with said manual valve for closing communication between the fluid force and said aforesaid valve to prevent the escape of fluid therethrough when the emergency control is operated.

10. In combination with the stabilizing means of an aircraft, fluid pressure-operated means for actuating said stabilizing means, a source of fluid supply, a valve adapted to control the flow of fluid to said mechanism being normally closed to said source but offering communication between said mechanism and the atmosphere, means for automatically reversing said valve upon tilting of the aircraft, said means including a perpendicle with connections to operate said valve, an emergency control including a manual valve for introducing fluid into said mechanism independently of the automatically controlled valve, and electro-magnetic means which is actuated simultaneously with and by said manual control valve to sever communication between the automatic valve and said mechanism when the emergency control is operated to prevent the escape of fluid through said automatic valve.

11. In combination with the stabilizing means of an aircraft, fluid pressure-operated mechanism for actuating said stabilizing means, a source of fluid supply, a valve for controlling the admission of fluid in said mechanism, an electric motor for actuating the valve, and means which maintains the passage of current through the motor in one direction while the aircraft is on an even keel to keep the actuating mechanism out of communication with the fluid supply but in communication with the atmosphere, and reverse the direction of current through the motor when the aircraft tilts to open said mechanism to the supply but close it to atmosphere.

12. In combination with the stabilizing means of an aircraft, fluid pressure-operated mechanism for actuating the stabilizing means, a source of fluid supply, a valve for controlling the passage of fluid into said mechanism, a motor for operating the valve, switch mechanism normally maintaining a current flow through the motor in one direction to keep the valve closed to the fluid supply but open to atmosphere, and a perpendicle which is shiftable when the aircraft tilts to actuate the switch mechanism and reverse the direction of current flow and thus cause the operation of said mechanism.

13. In combination with the stabilizing means of an aircraft, fluid pressure-operated mechanism to actuate said stabilizing means, electro-mechanical means for controlling the passage of fluid into said mechanism, an electrical circuit embracing said means and including a source of current, switch mechanism normally causing the current to flow through said electro-mechanical means in one direction to close the fluid supply to said mechanism, a perpendicle which is shiftable when the aircraft shifts, and means which is movable by the shifting perpendicle to operate the switch mechanism and reverse the current in said electro-mechanical means.

14. Means to control the stabilizing means of an aircraft comprising fluid pressure-operated mechanism with connections to actuate said stabilizing means, electro-mechanical means to control the passage of fluid into said mechanism, a switch which includes a movable member having a tooth and is normally positioned to send current through said electro-mechanical means in one direction to shut off the fluid supply, a perpendicle including a toothed member, and a rack bar having teeth engaging said member and other teeth adapted to engage the switch tooth for the reversal of current through said electro-mechanical means upon shifting of the perpendicle when the aircraft departs from the flying plane.

15. Means for controlling the stabilizing means of an aircraft comprising a frame, means upon which the frame is rockably mounted, a perpendicle carried by the frame and having revolving means to keep it in the perpendicular position, a semi-globular gear carried by the perpendicle, the teeth of which run in one direction in respect to the frame, mechanism by which the stabilizing means is adapted to be actuated, and means for controlling the operation of said mechanism including a rack bar in mesh with said gear and operated thereby when the aircraft tilts transversely to the direction of the gear teeth.

16. Means to control the stabilizing means of an aircraft comprising a frame, a pair of perpendicles of which each has revolving means to keep it perpendicular, semi-globular gears carried by the perpendicles the teeth of which are in opposite directions to each other, separate mechanisms by which the lateral and longitudinal stabilizing means respectively are actuated, means associated with the respective perpendicles for controlling the operation of said mechanisms, each controlling means including a rack in mesh with said gears and which are accordingly disposed at right angles to each other, means upon which the frame is mounted to rock in accordance with one direction of tilting of the aircraft to accordingly cause the operation of the rack bar the teeth of which are transverse to said direction of tilt, and means by which both perpendicles are rockably mounted upon the frame so as to cause the operation of the other rack bar when the aircraft tilts transversely to the teeth thereof.

17. Means for controlling the stabilizing means of an aircraft comprising a pair of rack bars at right angles to each other, a perpendicle controlling each rack bar, a semi-globular gear carried by each perpendicle the teeth of the gears being at right angles to correspond with the rack bars, separate mechanisms for controlling the longitudinal and lateral stabilization of the aircraft, means capable of operation by the rack bars to in turn control said mechanisms, and means upon which the perpendicles are mounted to cause an operation of one or the other rack bar according to the tilting of the aircraft.

18. Means for controlling the stabilizing means of an aircraft comprising a frame which is rockable on one axis, a perpendicle, a bridge supporting the perpendicle mounted on the frame to rock on a right angular axis, mechanism to operate said stabilizing means, and means to control the operation of said mechanism adapted to be actuated by the perpendicle when the aircraft tilts in the direction of the second axis but not when it tilts in the direction of the first axis.

19. Means for controlling the stabilizing means of an aircraft comprising a frame which is mounted to rock on an axis parallel to the longitudinal axis of the aircraft, a pair of perpendicles carried by the frame, bridges supporting the perpendicles mounted on axes parallel to the transverse axis of the aircraft, mechanisms to operate the lateral and longitudinal stabilizing means, controlling means actuated by one perpendicle when the aircraft tilts on the transverse axis, controlling means actuated by the other perpendicle, when the aircraft tilts on the longitudinal axis, and means causing both bridges to rock together when the aircraft tilts on said transverse axis.

20. Means for controlling the stabilizing means of an aircraft including a perpendicle having a governor, a motor for revolving the governor continuously, and means to restrain the governor from reaching the maximum rotational plane until the motor reaches the highest speed.

21. Means for controlling the stabilizing means of an aircraft including a perpendicle having a governor, a motor by which the governor is adapted to be revolved continuously, and means exerting pressure upon the arms of the governor to restrain them from reaching the maximum rotational plane until the motor reaches the highest speed.

22. Means to control the stabilizing means of an aircraft including a perpendicle having a governor, a motor for continuously revolving the governor, a casing positioned over each governor arm, means extending from the casing into contact with an adjacent arm, and means contained by the casing exerting pressure on said extending means and upon said arms in turn to restrain the governor from reaching the maximum rotational plane until the motor reaches the highest speed.

23. Means to control the stabilizing means of an aircraft including a perpendicle having a hollow globe, a motor having a shaft to which the globe is attached and by which it is adapted to be revolved, and a quantity of mercury contained by the globe adapted to rise up the sides of the globe upon revolution to exert a stabilizing effort upon the perpendicle and aid in maintaining it in a perpendicular position.

24. Means for controlling the stabilizing means of an aircraft including a perpendicle having a governor, a hollow globe containing a quantity of mercury, a ring suspended beneath the globe by a universal joint, and a motor to the shaft of which the globe is attached and by which the governor is supported, adapted to revolve all together so as to maintain the perpendicularity of the perpendicle by virtue of the centrifugal force exerted as a consequence of said rotation.

25. Means for controlling the stabilizing means of an aircraft comprising a perpendicle, switch mechanism having a straight rack bar by which it is operated, and a gear carried by the perpendicle for the operation of the rack bar of semi-globular shape to maintain engagement with the rack bar whether the perpendicle swings along the axis of the rack bar or transversely thereto.

26. Means to control the stabilizing means of an aircraft including a perpendicle, switch mechanism including a rack bar by which it is operated, a semi-globular gear in permanent mesh with the teeth of the rack bar, supporting means for the perpendicle, and means by which the supporting means is journalled below the center of gravity so as to more readily swing upon a predetermined tilting of the aircraft.

27. Means for controlling the stabilizing means of an aircraft including two perpendicles respectively associated with the lateral and longitudinal stabilization of the aircraft, separate switch mechanisms, rack bars for operating them disposed at right angles to each other, a semi-globular gear carried by each perpendicle in mesh with the respective rack bars, means to support each perpendicle, a frame upon which the supporting means are journalled below the centers of gravity to more readily rock when the aircraft tilts longitudinally, means connecting said supporting means so that they may rock in unison, and means upon which the frame is journalled below the center of gravity so as to more readily rock when the aircraft tilts laterally.

28. Means for controlling the stabilizing means of an aircraft including a perpendicle, a revolving governor to keep the perpendicle in the perpendicular position, and means which exerts an even pressure on the governor arms while the perpendicle maintains such position but exerts an uneven pressure upon said arms when the perpendicle tends to depart from such position and thereby upset the balance, so as to immediately act upon the governor and force the perpendicle back to the balanced position.

29. Means to control the stabilizing means of an aircraft comprising mechanism to operate said stabilizing means, electro-mechanical means to control the admission of working fluid for the operation of said mechanism, a movable switch for controlling the passage of electrical currents through said electro-mechanical means, means on the switch which is to be engaged for its operation, and means which depends upon the tilting of the aircraft for its movement to operate the switch and including means to successively strike said engageable means to keep the switch at one shifted adjustment regardless of the varying degrees at which the aircraft may be tilted.

30. Means to control the stabilizing means of an aircraft comprising mechanism to operate said stabilizing means, electro-mechanical means to control the admission of working fluid through said mechanism, a switch to control the passage of electrical currents for the operation of the electro-mechanical means, means on the switch which is to be engaged for its operation, a rack with a plurality of teeth, and means which operates upon tilting of the aircraft to move the rack toward said engageable means a distance depending on the amount of tilting, thereby shifting the switch to one position and keeping it there until the aircraft is restored.

31. Means to control the stabilizing means of an aircraft including a switch controlling an electric circuit, a stationary contact and a movable contactor embodied in said switch, an engageable tooth on the contactor, a bar which is shiftable in respect to the switch to distances which increase with the degree of tilting of the aircraft, and teeth carried by the bar which are engageable with said tooth to shift the movable member and reverse the electrical current in said circuit, the engagement of successive teeth merely causing the maintenance of the shifted position of said member and not its movement beyond the current-reversing position.

32. Means to control the stabilizing means of an aircraft, comprising mechanism by which the stabilizing means is operated, electro-mechanical means for controlling the admission of working fluid to said mechanism, a switch comprising a stationary member with two pairs of contacts, an electrical circuit embracing the switch and said electro-mechanical means, a movable member in the switch contacting one pair of contacts to maintain a current through the electro-mechanical means in one direction to shut off the fluid supply, a perpendicle, and means operated by the perpendicle when the aircraft tilts to in turn actuate the switch and shift the contactor to reverse the current for the admission of fluid to said mechanism, the amount of shifting of said contactor being predetermined regardless of the distances of movement of the shifting means.

33. Means to control the stabilizing means of an aircraft comprising means for operating said stabilizing means, electro-mechanical means for controlling the passage of working fluid into said mechanism, and means embodied in said electro-mechanical means by which the fluid may be admitted in steadily increasing quantities.

34. Means to control the stabilizing means of an aircraft including a cylinder with a piston having means to operate said stabilizing means, a valve to control the admission of working fluid into said cylinder, and means which is adapted to open the valve with increasing speed until full opening is obtained in order to gradually introduce said working fluid.

35. Means to control the stabilizing means of an aircraft comprising a cylinder with a piston having means to operate said stabilizing means, a valve to control the admission of working fluid to the cylinder, a motor having a revoluble shaft, and means carried by the shaft adapted to open the valve with increasing speed until a full opening is reached, thereby to gradually introduce said fluid to said cylinder.

36. Means to control the stabilizing means of an aircraft including a cylinder having a piston with connections for operating the stabilizing means, a valve to control the admission of working fluid into said cylinder, an electric motor, a switch maintaining a flow of current through the motor in one direction means which is affected by tiltings of the aircraft to actuate the switch and reverse the direction of current through the motor, the length of time of the shifted condition of the switch and of the reversal of current through the motor depending on the degree of tilting, and means carried by the shaft of the motor to open the fluid valve with increasing speed during the period of reversal or until said valve is completely opened.

37. Means for controlling the stabilizing means of an aircraft including a cylinder having a piston with connections for operating said stabilizing means, a valve for controlling the admission of working fluid to the cylinder, an exhaust valve which is normally open to establish communication between the cylinder and the atmosphere, and common valve actuating means adapted to first suddenly close the exhaust valve then open the fluid valve with increasing speed until a full opening is reached.

38. Means for controlling the stabilizing means of an aircraft including a cylinder having a piston with connections for operating the stabilizing means, a normally closed valve for controlling the admission of working fluid to the cylinder, an exhaust valve, common valve actuating means including a shaft with means to normally hold the exhaust valve opened to establish communication between the cylinder and the atmosphere, means on the shaft which is adapted to open the fluid valve with increasing speed for the gradual influx of working fluid to the cylinder, and means for turning the shaft to first cause the said closure of the exhaust valve and then the aforesaid operation of the fluid valve.

39. Means to control the stabilizing means of an aircraft including a cylinder having a piston with connections for operating said stabilizing means, a normally closed valve for controlling the admission of working fluid to the cylinder, an exhaust valve, common valve-actuating means including a shaft having an eccentric normally in position to hold the exhaust valve open and establish communication between the cylinder and the atmosphere, a cam normally in position to enable the maintenance of the fluid valve in the closed position, and means to turn the shaft to thereby first move the eccentric and cause the closure of the exhaust valve after which the cam will have moved into position to start opening the fluid valve with increasing speed.

40. Means to control the stabilizing means of an aircraft including a cylinder having a piston with connections for operating said stabilizing means, and means to control the operation of the piston comprising a casing having a passage with a plurality of longitudinal grooves, a valve for controlling the passage of working fluid through said passage into the cylinder, means keeping the valve at one end of the passage to close the grooves, an exhaust valve controlling a passage from the cylinder to atmosphere, a shaft having an eccentric normally in position to keep the exhaust valve open and a cam normally in position to enable the inlet valve to maintain a closed position, and means to turn the shaft so that the eccentric first releases the exhaust valve to close the corresponding passage and that the cam next engages the intake valve causing an opening of the longitudinal grooves to increasing degrees for the filling of the cylinder with an increasing volume of working fluid.

41. Means to control the stabilizing means of an aircraft, including a cylinder having a piston with connections for operating the stabilizing means, a source of pressure fluid to move the piston, a valve to control the admission of fluid to the cylinder, an electric motor for operating the valve, a switch normally in one position to maintain the flow of electric current through the motor in one direction and maintain the valve in the closed position, means which operates to shift the switch and reverse the direction of current through the motor to enable opening of said valve upon tilting of the aircraft to thereby cause the operation of the stabilizing means, and normally closed means interposed between the fluid source and the controlling valve, opened upon said shifting of the switch and immediately closed upon restoration of the switch to the original position to again cut off the fluid source independently of the motor.

42. Means to control the stabilizing means of an aircraft including mechanism to operate said stabilizing means, a conduit to supply pressure fluid to the mechanism, a normally closed valve to control the admission of fluid to said mechanism, normally closed means in the conduit between the valve and source of fluid supply, an electric motor for operating the fluid valve, a switch normally in position to direct a current through the motor in one direction to enable the valve to remain closed, and means which operate upon the tilting of the aircraft to first shift the switch and cause the interposed means to open and the current through the motor to reverse to open the valve for the admission of fluid to the mechanism and the resultant operation of the stabilizing means, and second to restore the switch upon righting of the aircraft to again reverse the current in the motor for the closing of the valve but also cause the closing of said interposed means to shut off the fluid before the motor functions for that purpose.

43. Means to control the stabilizing means of an aircraft including mechanism for operating said stabilizing means, a pressure fluid supply conduit, an electro-mechanical valve to control the passage of fluid through said conduit, a normally closed electro-magnetic valve between the aforesaid valve and the source of fluid supply, a switch normally in position to maintain a current flow through the electro-mechanical valve in one direction to maintain said valve closed and normally keeping the electro-magnetic valve closed, and means which is adapted to shift upon tilting of the aircraft to in turn shift the switch, energize the electro-magnetic valve to open the conduit and reverse the current in said electro-mechanical valve to admit the fluid into said mechanism, said shifting means being adapted (upon righting of the aircraft) to simultaneously deenergize the electro-magnetic valve and again reverse the current in said electro-mechanical valve causing a closure of the conduit before said electro-mechanical valve can function for that purpose.

44. Means to control the stabilizing means of an aircraft including a conduit, a valve controlling the passage of pressure fluid through said conduit, a motor for operating the valve, an electro-magnetic cut-off in the passage between said valve and the fluid source, an electrical circuit embracing the motor, a switch in said circuit normally in one position to send current through the motor in one direction to keep said valve closed, means to shift the switch to reverse the direction of current through the motor and cause the opening of the valve, a shunt circuit embracing the electro-magnetic cut-off and which is energized upon said shifting of the switch to first open the conduit, and means associated with said cut-off to promptly close it when the switch is reversed to cut off the fluid supply before the motor can function for that purpose.

45. Means to control the stabilizing means of an aircraft including a conduit, a normally closed valve adapted to control the flow of pressure fluid through said conduit, an electro-magnetic valve normally cutting off the flow of fluid to the aforesaid valve, an electric motor for operating said valve, a switch having a pair of contacts and a brush normally completing a circuit through the motor in one direction to enable the fluid valve to remain closed, means to shift the brush of the switch across other contacts to close another circuit through the motor to reverse the same and cause the opening of the fluid valve, and an electrical circuit embracing said electro-magnetic valve in shunt across said second circuit causing the energization of said electro-magnetic valve upon the reversal of the motor so that the conduit is opened for the fluid valve.

46. Means to control the stabilizing means of an aircraft including mechanism to operate said stabilizing means, a conduit for conducting pressure fluid for the operation of said mechanism, a motor-driven valve for controlling the fluid, an electro-magnetic valve in the conduit between the fluid valve and the fluid force, a switch adapted to move in one direction and direct electrical currents for the rotation of the motor to open the fluid valve and to energize and open the electro-magnetic valve as the motor begins to rotate, means to move the switch in the other direction to reverse the current through the motor and to deenergize the electro-magnetic valve, and means to close said valve as the motor begins to rotate in the reverse and fluid valve-closing direction.

47. Means to control the stabilizing means of an aircraft comprising mechanism for operating the stabilizing means when the aircraft tilts, a motor valve for controlling the admission of pressure fluid into said mechanism for its operation, electrical means normally establishing a circuit through the motor so as to enable the valve to remain closed but adapted to reverse the motor for the opening of the valve to operate the stabilizing means when the aircraft tilts, and means which is set into operation when the function of the stabilizing means is instituted to retard the reversal of the motor to its normal condition so as to hold the stabilizing means in said operated position until the aircraft approximately reaches the righted position.

48. Means to control the stabilizing means of an aircraft comprising mechanism by which said stabilizing means is operated when the aircraft tilts, a motor valve controlling the passage of pressure fluid for the operation of said mechanism, electrical means normally establishing the flow of current through the motor holding it in position to maintain the closure of the fluid valve, means associated with said electrical means to shift the latter upon tilting of the aircraft to reverse said current and motor to open the valve and thus institute the functioning of the stabilizing means, said associated means again causing a shifting in said electrical means when the aircraft starts to right to again reverse said current and motor for the closing of the valve; and means associated with said electrical means to resist the passage of said reversed current to retard the closure of the motor valve so as to maintain the stabilizing means in the adjusted position until the aircraft approximately reaches the righted position.

49. Means to control the stabilizing means of an aircraft comprising mechanism for operating said stabilizing means, a pressure fluid-controlling valve having an electric motor for operating the same, a switch to control the passage of current through the motor so as to cause either the closing or opening of the valve, and means associated with the switch causing the motor to promptly close the valve when the aircraft tilts but a slight degree and causing a retardation of the motor to delay the closing of the valve when the aircraft tilts to a great degree.

50. Means to control the stabilizing means of an aircraft comprising mechanism for operating said stabilizing means, a pressure fluid-controlling valve having a motor for operating the same, a switch for controlling the passage of currents through the motor to either close or open the valve, and a rheostat associated with said switch having an arm adapted to traverse a long contact and enable the prompt closure of the valve upon restoration of the aircraft from a slightly tilted position, and a plurality of resistance contacts traversible by the arm to retard the operation of the motor in closing the valve as the aircraft is restored from a greatly tilted position.

51. Means to control the stabilizing means of an aircraft comprising a perpendicle which includes a motor for its continuous operation, an electrical circuit for energizing the motor, a signal lamp in shunt with said circuit to indicate that the motor is in operation, a pair of mechanisms for controlling certain parts of the stabilizing means, each mechanism including a motor, a pair of electric switches normally in one position to control the passage of electric current from the aforesaid circuit through the motors in one direction, a pair of signal lamps in predetermined disposition in respect to the aforesaid signal lamps and in shunt with said motor circuits to indicate that the aircraft is on an even keel, and another pair of signal lamps in a predetermined disposition in respect to the aforesaid signal lamp, of which one is adapted to be lighted while the diagonally opposite one of the aforesaid signal lamps is extinguished upon tilting of the aircraft and the consequent shifting of one of said switches to reverse the direction of the current through the accompanying motor.

52. Means to control the stabilizing means of an aircraft including a central signal lamp and a pair of signal lamps above and below it, a perpendicle including a motor, an electrical circuit continuously energizing the motor and upon which the central signal lamp is shunted to designate the operation of the motor, a pair of mechanisms for operating certain parts of the stabilizing means each including a motor, a pair of electrical switches respectively in normal positions to close circuits in one direction through the motors, the lowermost signal lamps being connected in said circuits to indicate the energization of said motors in the one direction; and means operated by said perpendicle when the aircraft tilts to one side causing a reversal of one of the switches to reverse the direction of current through the corresponding motor and thereby extinguish one of said lowermost lamps and light the diagonally opposite one of the uppermost lamps to form an indication of the direction in which the aircraft is tilting.

53. Means to control the stabilizing means of an aircraft comprising a perpendicle having a motor, an electrical circuit for continuously energizing the motor, a central signal lamp in shunt with said circuit to indicate the continuous operation of the motor, pairs of signal lamps below and above said central signal lamp, a pair of mechanisms for operating certain parts of the stabilizing means each including a motor, a pair of switches of which each has two pairs of contacts controlling corresponding pairs of circuits to the motors, a brush in each switch bridging one pair of contacts to energize each motor by current in one direction, said lowermost signal lamps being in connection with said energizing circuits and thereby normally lighted to indicate the energization of said motors; and means operated by the perpendicle upon tilting of the aircraft to shift one of the switches and cause the brush to bridge the other set of contacts to energize the other circuit and reverse the direction of current through the corresponding motor, said shifting of the switch causing one of the lowermost lamps to be extinguished and another of the uppermost lamps lighted and form a diagonal line with the central signal lamp to indicate the direction of tilting of the aircraft.

54. Means for controlling the stabilizing means of an aircraft comprising mechanisms for operating said stabilizing means, switch devices for exercising a control over said mechanisms, a perpendicle for actuating said switch devices when the aircraft tilts and consequently causing the automatic operation of said stabilizing means, a set of signal lamps to indicate the normal and tilted positions of the aircraft, said last being in connection with said switch devices, means for manually controlling said stabilizing means, means by which said mechanisms and switch devices are then disconnected, another set of signal lamps adapted to indicate tilted positions of the aircraft, and means associated with a part of said perpendicles which operates while the aircraft is under manual control to in turn control said manual signal lamps.

55. Means for controlling the stabilizing means of an aircraft comprising an apparatus by which said stabilizing means may be automatically operated, an apparatus by which said means may be manually operated, a lever which is shiftable from a position under automatic operation to a position under manual operation, a perpendicle forming part of the automatic apparatus including a motor having an electrical circuit which continuously energizes it, a central signal lamp which is perpetually lighted from said circuit to indicate that the motor is in operation, a pair of signal lamps in a circuit which is partly closed by the shifting of the lever into the manual operating position, means associated with the automatic apparatus and which is shifted by the perpendicle upon tilting of the aircraft, and a pair of contacts associated with each end of said shiftable means to close the other part of the circuit through one of said lamps and thereby form part of a diagonal line with said central signal lamp to indicate the direction of tilt of the aircraft.

56. Means for controlling the stabilizing means of an aircraft comprising mechanism for operating the longitudinal stabilizing element thereof, a perpendicle, a rack bar which is shifted by the perpendicle when the aircraft tilts longitudinally, and arrangement of contacts adapted to be engaged by said rack bar, signal lamps adapted to be lighted in a predetermined manner upon engagement of said contacts to indicate the direction of longitudinal tilting, another set of contacts adapted to be engaged by said bar when the aircraft tilts to a dangerous degree, and an individual signal lamp adapted to be then lighted to indicate such dangerous tilting.

57. Means for automatically controlling the stabilizing means of an aircraft comprising a cylinder having a piston with connections for the operation of said stabilizing means, a source of pressure fluid supply, valve mechanism for controlling the entrance of said fluid into the cylinder for the operation of the piston, means associated with said connections for operating the stabilizing means manually and independently of the automatic control, an exhaust valve situated at the pressure end of the cylinder, said valve having a connection with the fluid source, and a hand valve in said connection adapted to be opened when the aircraft is under manual control to insure the opening of said exhaust valve so that the movements of the piston may not be hindered.

JAMES HENRY THOMPSON.